United States Patent
Wu et al.

(10) Patent No.: US 12,149,337 B2
(45) Date of Patent: Nov. 19, 2024

(54) UPSTREAM RESOURCE GRANT METHOD, RELATED DEVICE, AND COMPUTER-READABLE STORAGE MEDIUM

(71) Applicant: Huawei Technologies Co., Ltd., Shenzhen (CN)

(72) Inventors: Xuming Wu, Wuhan (CN); Shiwei Nie, Dongguan (CN); Xiaofei Zeng, Dongguan (CN); Dekun Liu, Wuhan (CN); Gang Zheng, Dongguan (CN); Jun Zhou, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 17/827,467

(22) Filed: May 27, 2022

(65) Prior Publication Data
US 2022/0294551 A1  Sep. 15, 2022

Related U.S. Application Data

(63) Continuation of application No. PCT/CN2020/112139, filed on Aug. 28, 2020.

(30) Foreign Application Priority Data

Nov. 30, 2019  (CN) .......................... 201911209201.1

(51) Int. Cl.
*H04J 14/02* (2006.01)
*H04L 9/40* (2022.01)

(52) U.S. Cl.
CPC .......... *H04J 14/0235* (2013.01); *H04L 63/12* (2013.01)

(58) Field of Classification Search
CPC .............................. H04J 14/0235; H04L 63/12
(Continued)

(56) References Cited

U.S. PATENT DOCUMENTS

| 10,194,007 | B2 * | 1/2019 | Eddleston | .......... H04Q 11/0067 |
| 2018/0212705 | A1 | 7/2018 | Gao et al. | |

FOREIGN PATENT DOCUMENTS

| CN | 102474465 A | 5/2012 |
| CN | 102833640 A | 12/2012 |

(Continued)

OTHER PUBLICATIONS

"Draft Recommendation ITU-T G.987.3 (ex G.xgpon.3) (new) Rev .2 (AR) 10-Gigabit-capable passive optical networks (XG-PON): Transmission convergence (TC) specifications," IEE Draft, XP017737870, ITU-T G987.3, IEEE-SA, Piscataway, NJ USA, vol. 802.1, Total 151 pages, International Union of Telecommunication, Geneva, Switzerland (Oct. 18, 2010).

(Continued)

*Primary Examiner* — Mohammad R Sedighian
(74) *Attorney, Agent, or Firm* — Leydig, Voit & Mayer, Ltd.

(57) ABSTRACT

An upstream resource grant method, a device, a passive optical network, and a computer-readable storage medium are provided. The upstream resource grant method includes: obtaining, by an optical line terminal, an upstream grant message on which transformation processing has been performed, wherein a transformation parameter used for the transformation processing includes a physical identity of an optical network unit (ONU); and sending, by the optical line terminal, the upstream grant message on which the transformation processing has been performed, wherein the upstream grant message carries an upstream resource grant indication of the optical network unit, and the upstream (Continued)

resource grant indication indicates an upstream resource granted to the optical network unit. According to this application, an occurrence probability of a rogue ONU phenomenon is reduced, thereby improving service running stability of a PON system.

20 Claims, 21 Drawing Sheets

(58) Field of Classification Search
USPC .......................................................... 398/66
See application file for complete search history.

(56) References Cited

FOREIGN PATENT DOCUMENTS

| CN | 103636153 A | 3/2014 |
|----|-------------|--------|
| CN | 105516833 A | 4/2016 |
| CN | 107070757 A | 8/2017 |
| CN | 109150378 A | 1/2019 |
| CN | 110268650 A | 9/2019 |
| CN | 110418216 A | 11/2019 |
| CN | 111010628 A | 4/2020 |
| IN | 105592040 A | 5/2016 |
| JP | 2009017324 A | 1/2009 |
| JP | 2018500844 A | 1/2018 |
| JP | 2018500860 A | 1/2018 |
| JP | 2018526918 A | 9/2018 |
| WO | 2018020559 A1 | 2/2018 |

OTHER PUBLICATIONS

"Serires G: Transmission Systems and Media Digital Systems and Networks, Rogue optical network unit (ONU) considerations," G-series Recommendations, Supplement 49, XP044301088, ITU-T Standard G.984.x-series and ITU-T G.987.x-series, Total 16 pages, International Union of Telecommunication, Geneva, Switzerland (Feb. 25, 2011).

\* cited by examiner

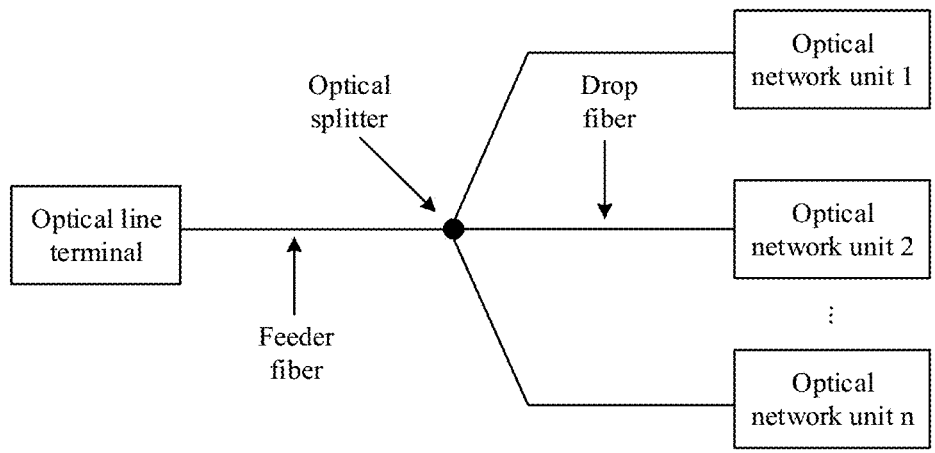
FIG. 1-A
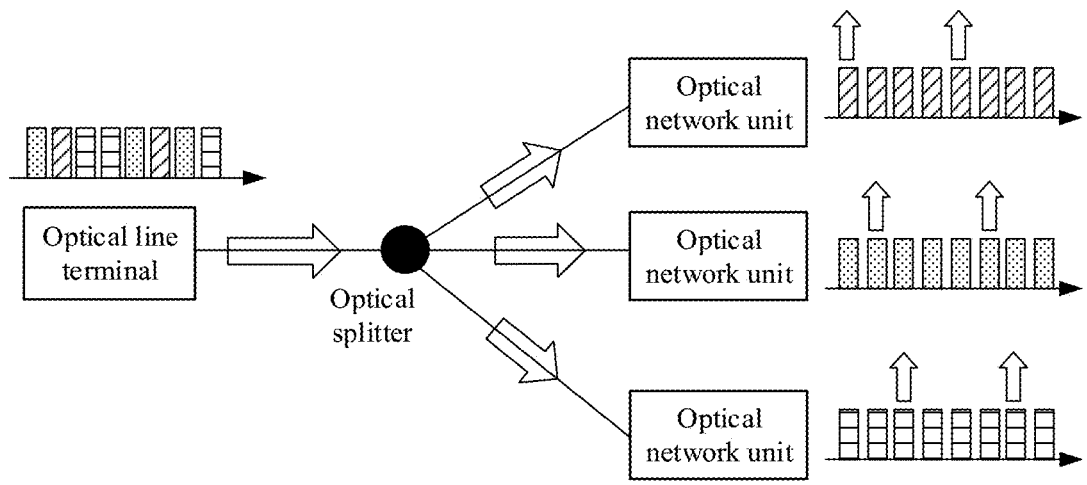
FIG. 1-B
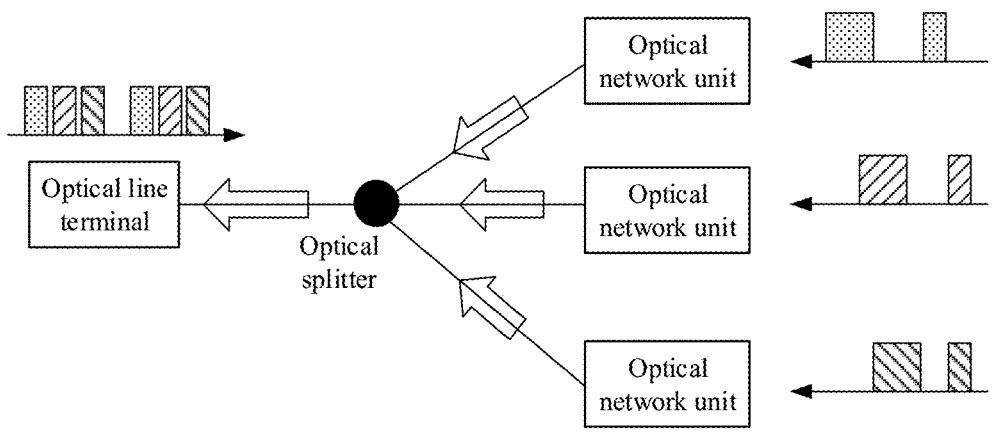
FIG. 1-C

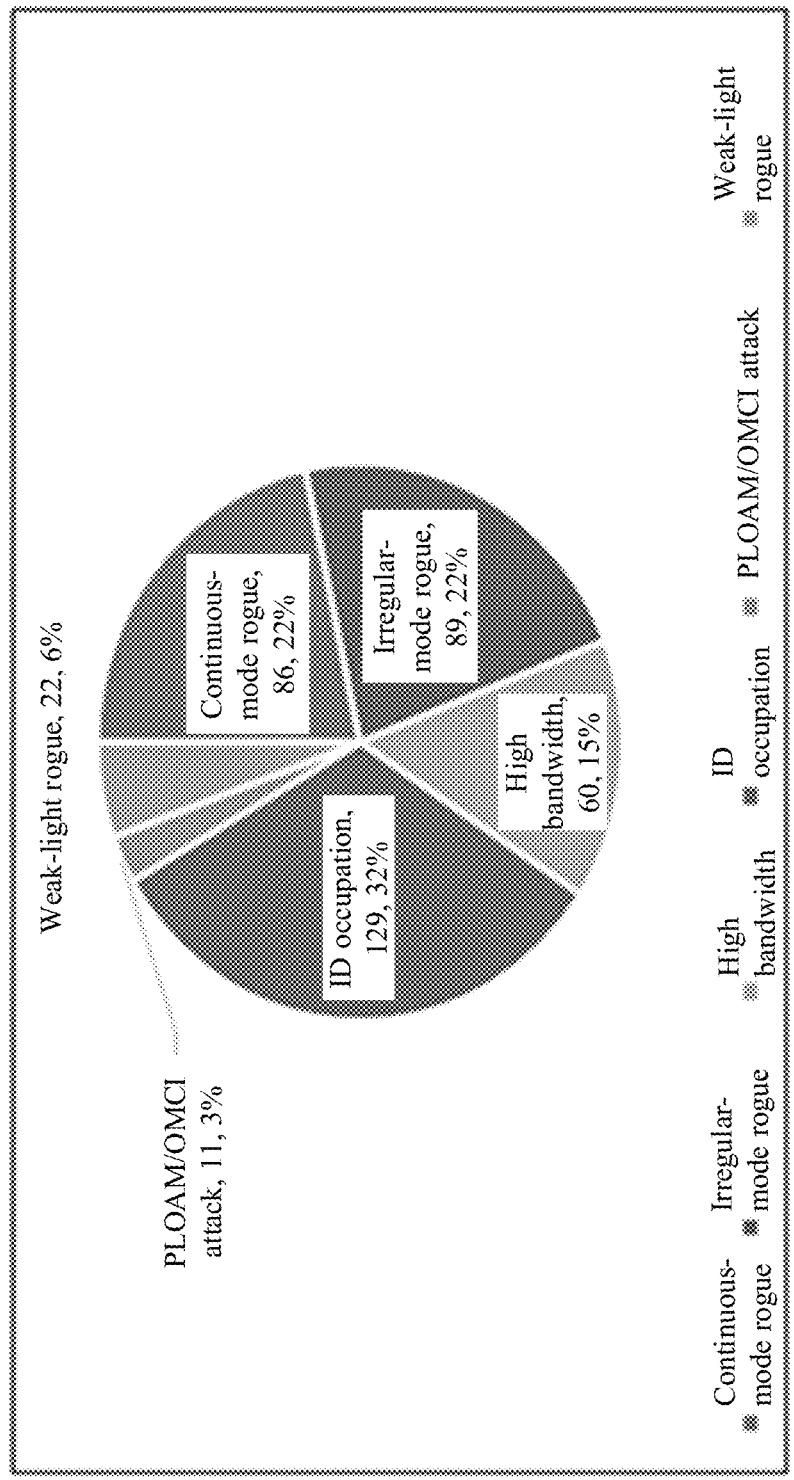
FIG. 1-D

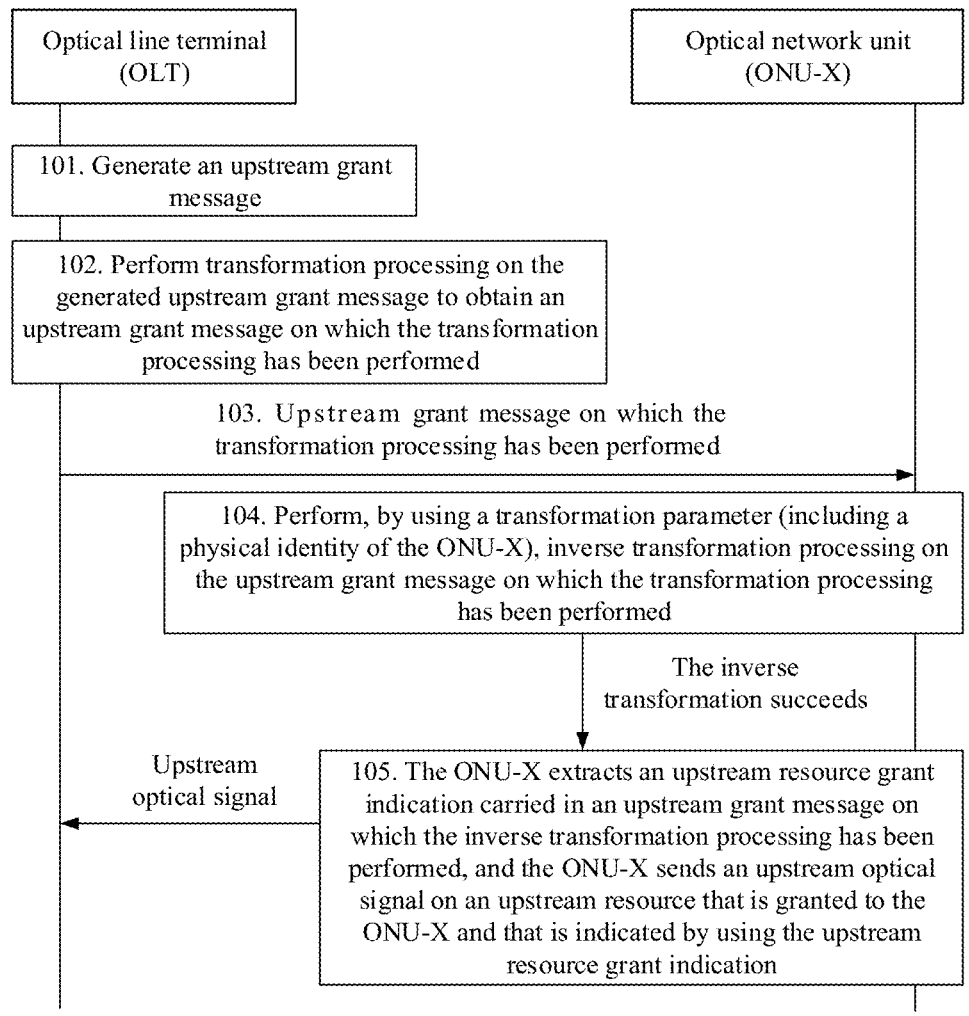
FIG. 1-E
| Optical network unit | Physical identity of an optical network unit | ... |
|---|---|---|
| ONU-A | SN-A | ... |
| ONU-B | SN-B | ... |
| ... | ... | ... |
| ... | ... | ... |
| ONU-X | SN-X | ... |
| ONU-Y | SN-Y | ... |
| ... | ... | ... |
FIG. 1-F

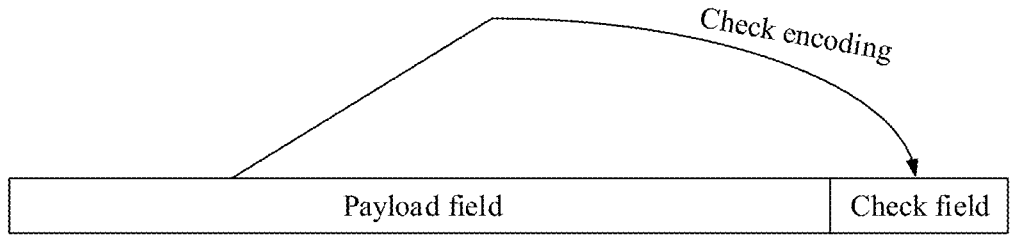
FIG. 1-G
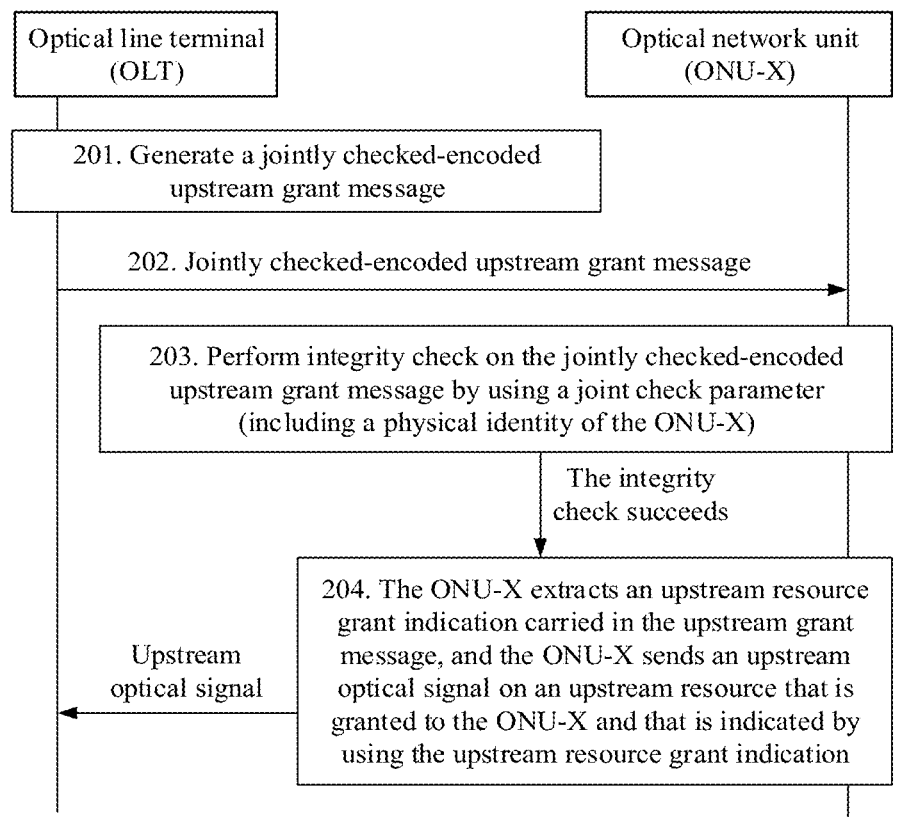
FIG. 2-A
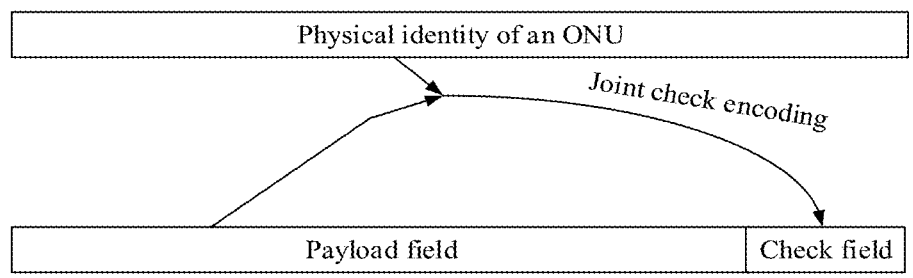
FIG. 2-B

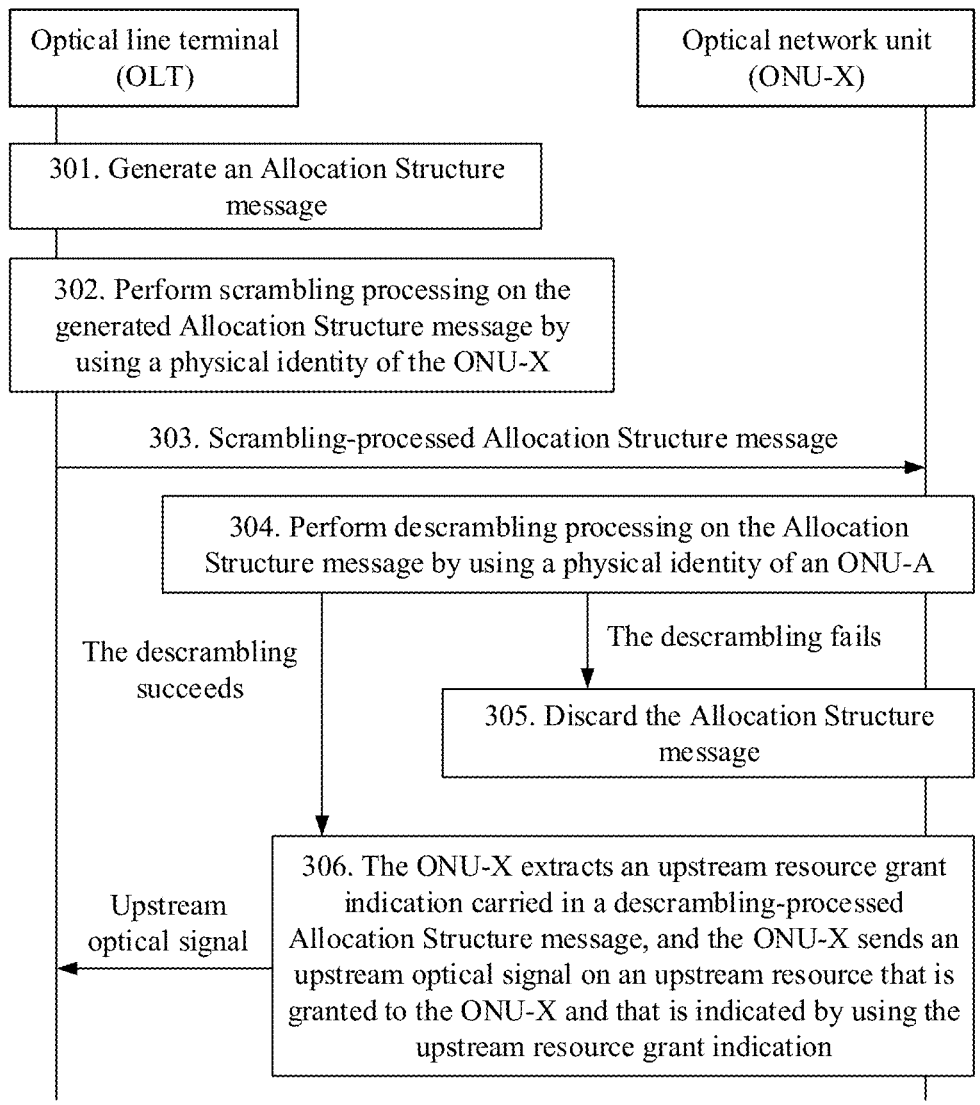
FIG. 3-A

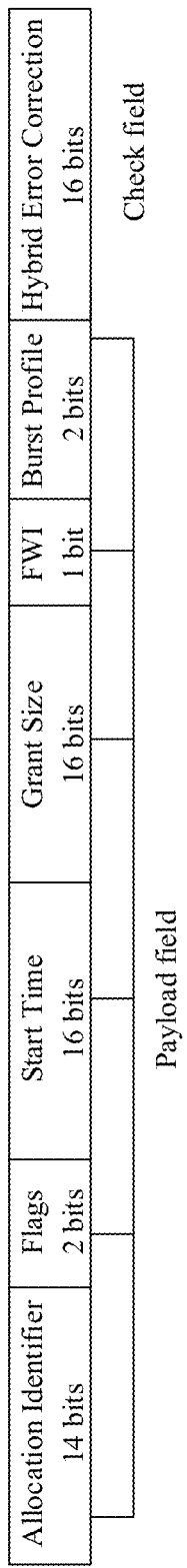
FIG. 3-B
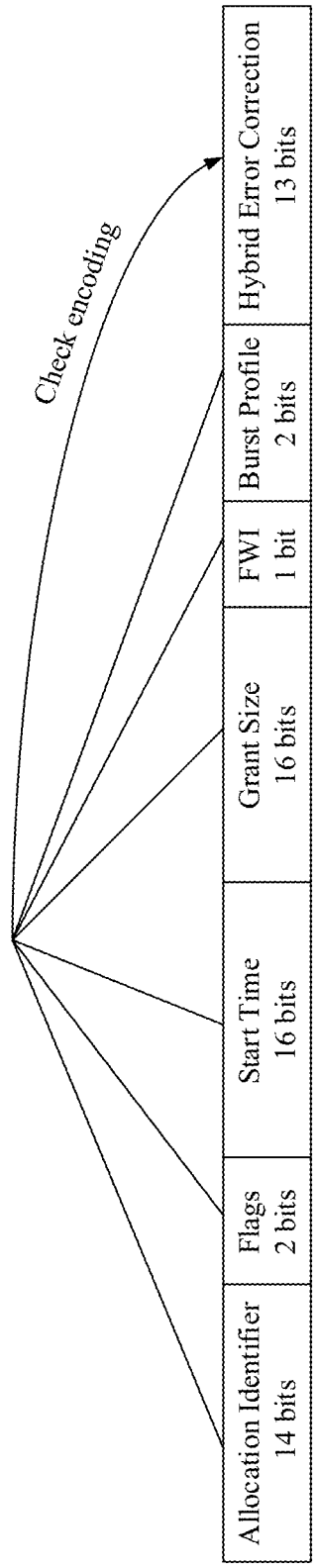
FIG. 3-C

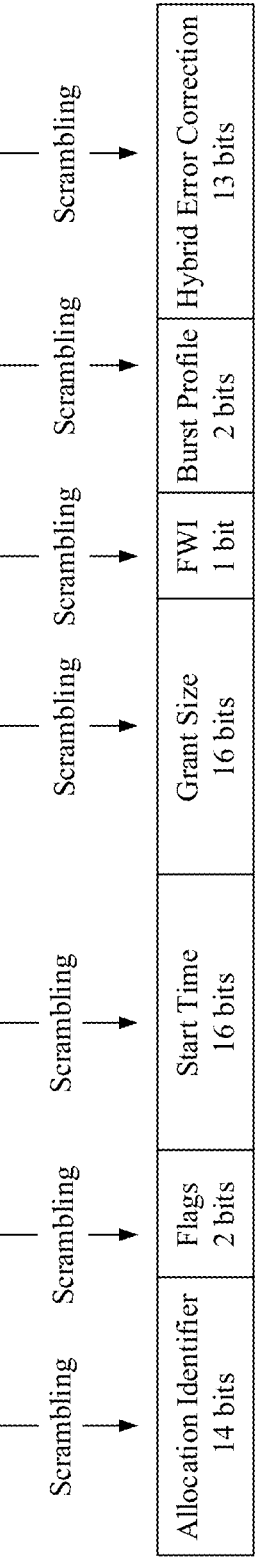
FIG. 3-D
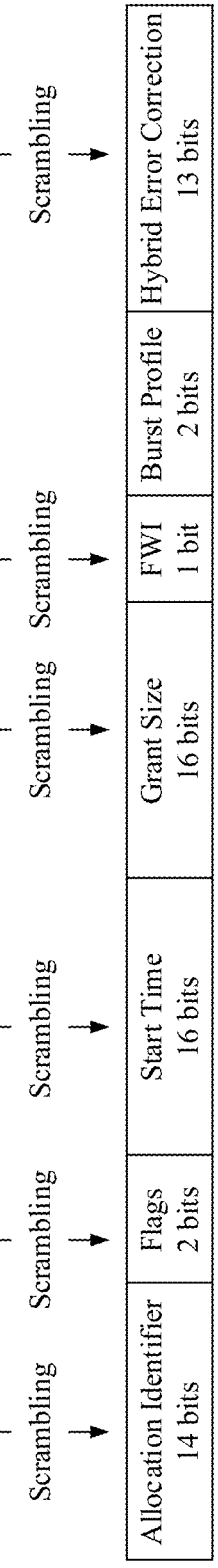
FIG. 3-E

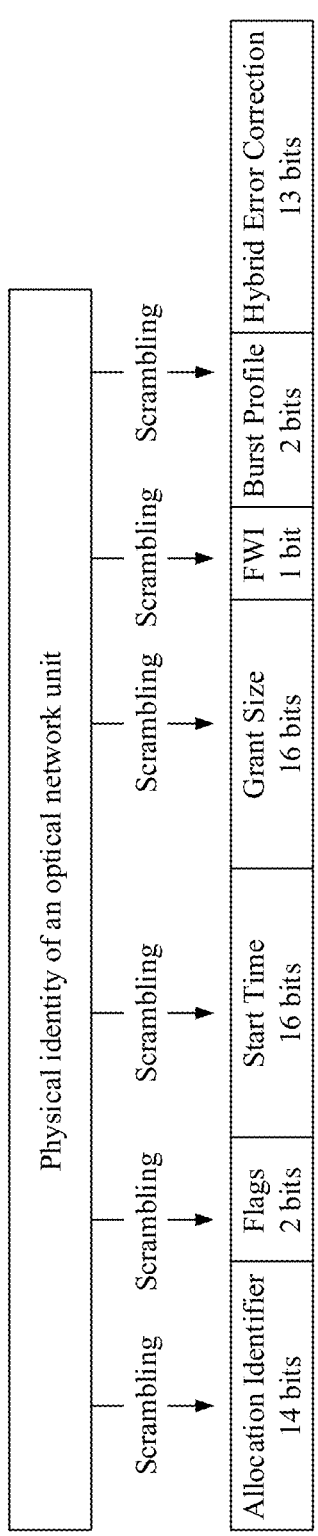
FIG. 3-F
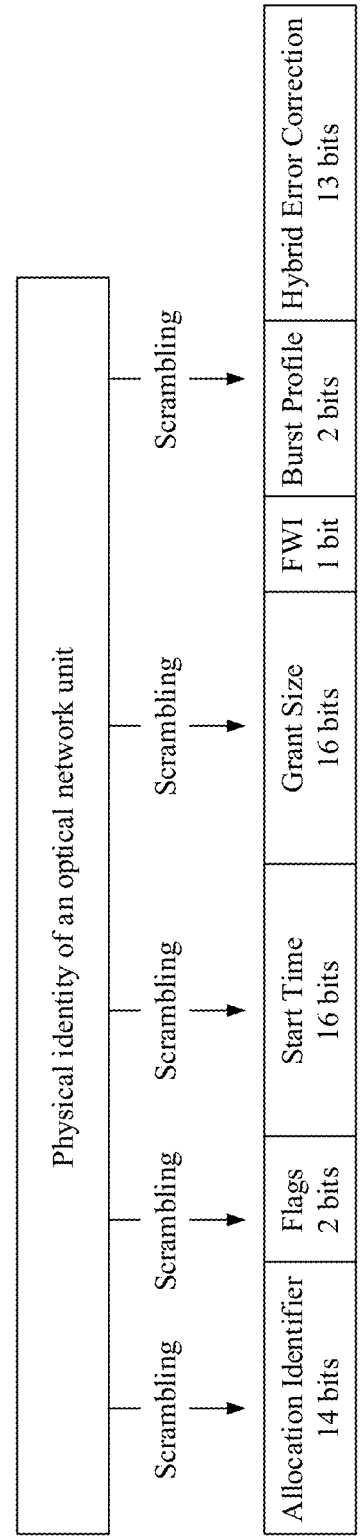
FIG. 3-G

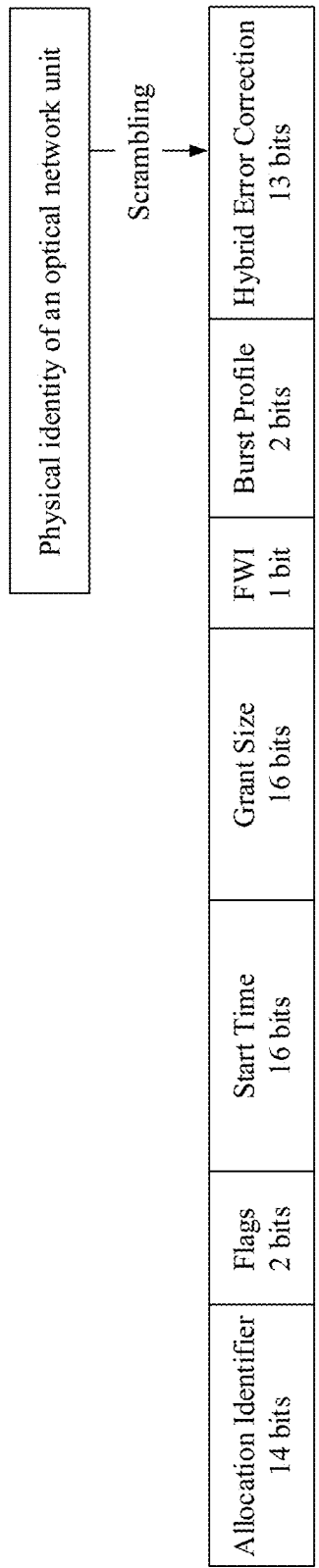
FIG. 3-H
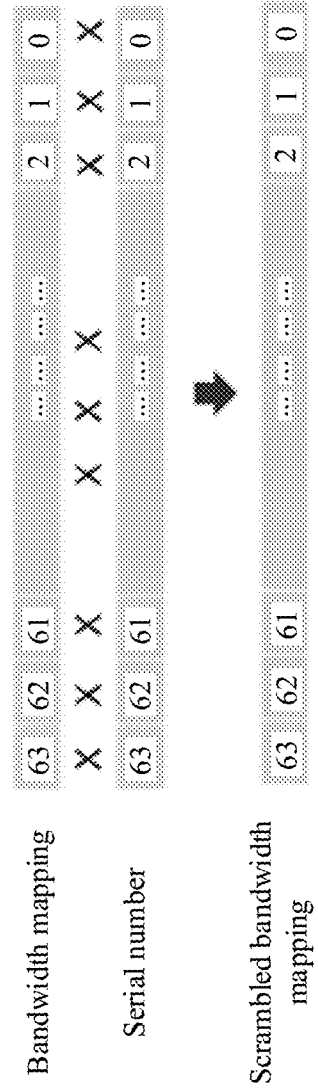
FIG. 3-I

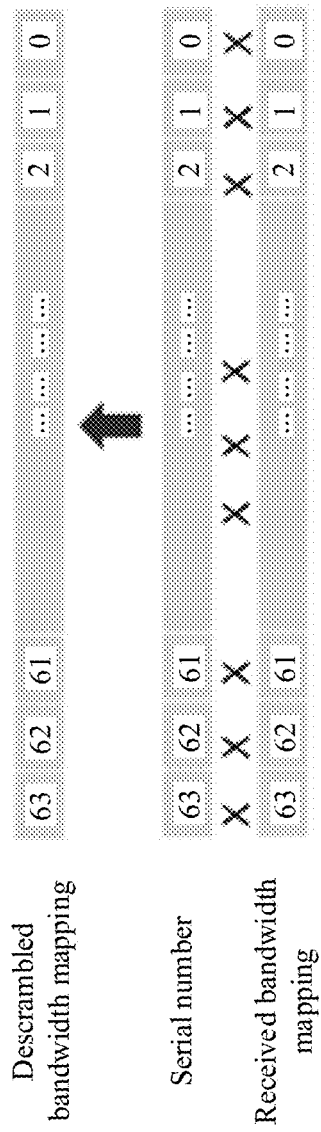
FIG. 3-J
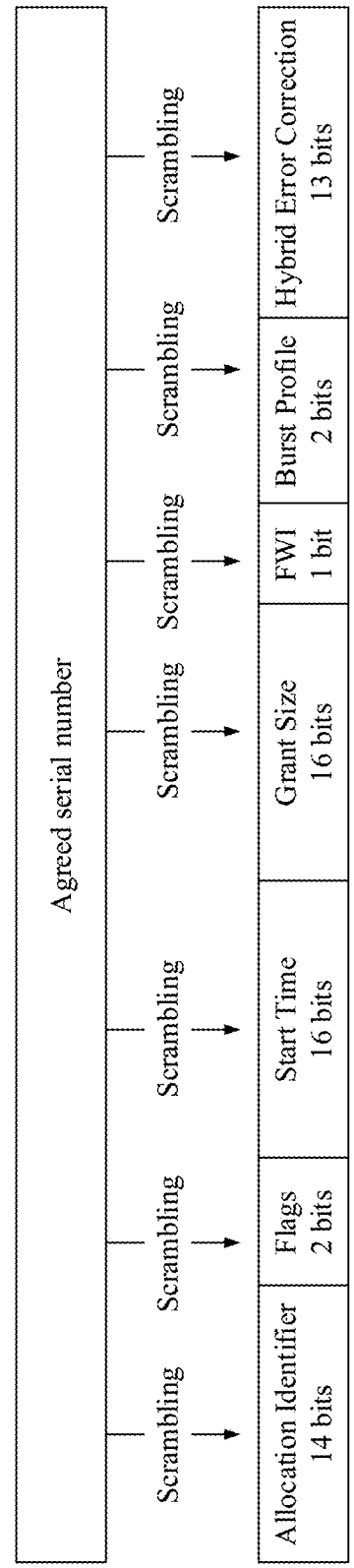
FIG. 3-K

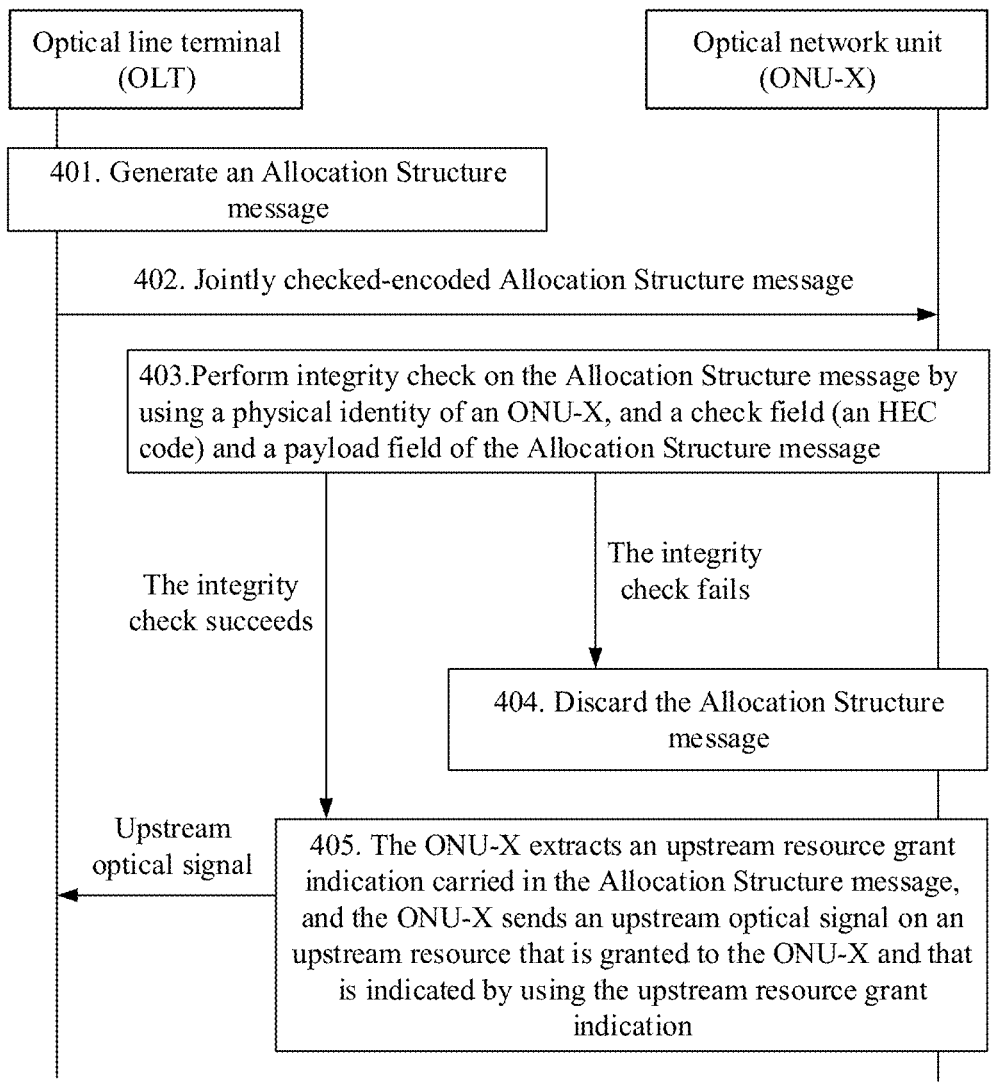
FIG. 4-A

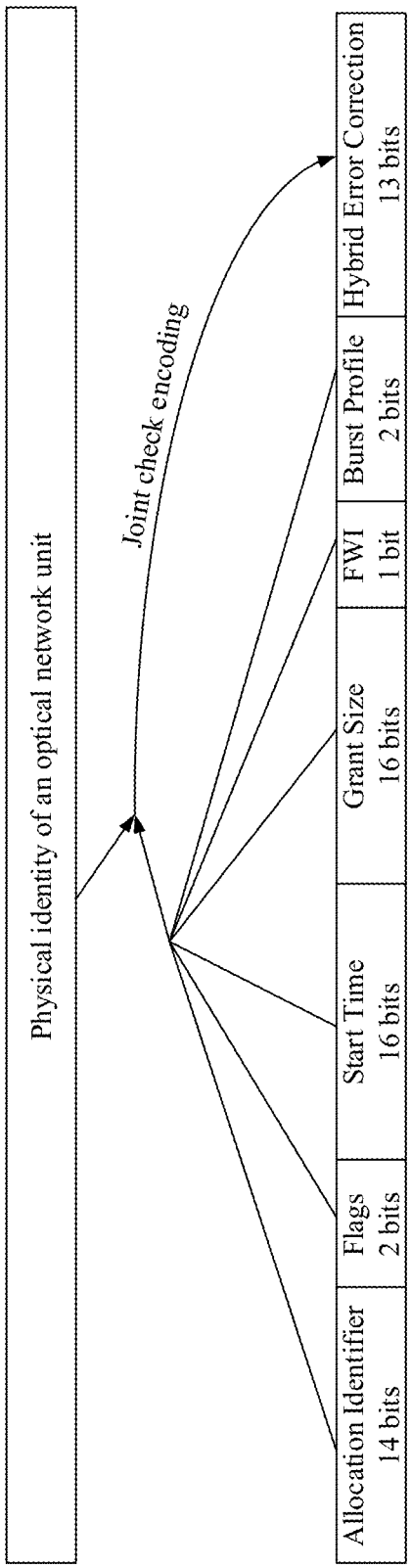
FIG. 4-B
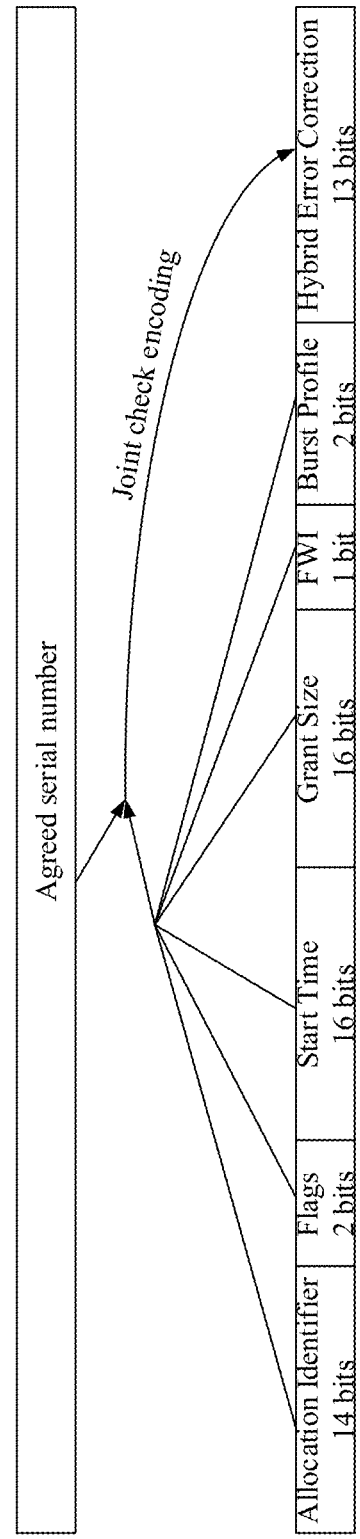
FIG. 4-C

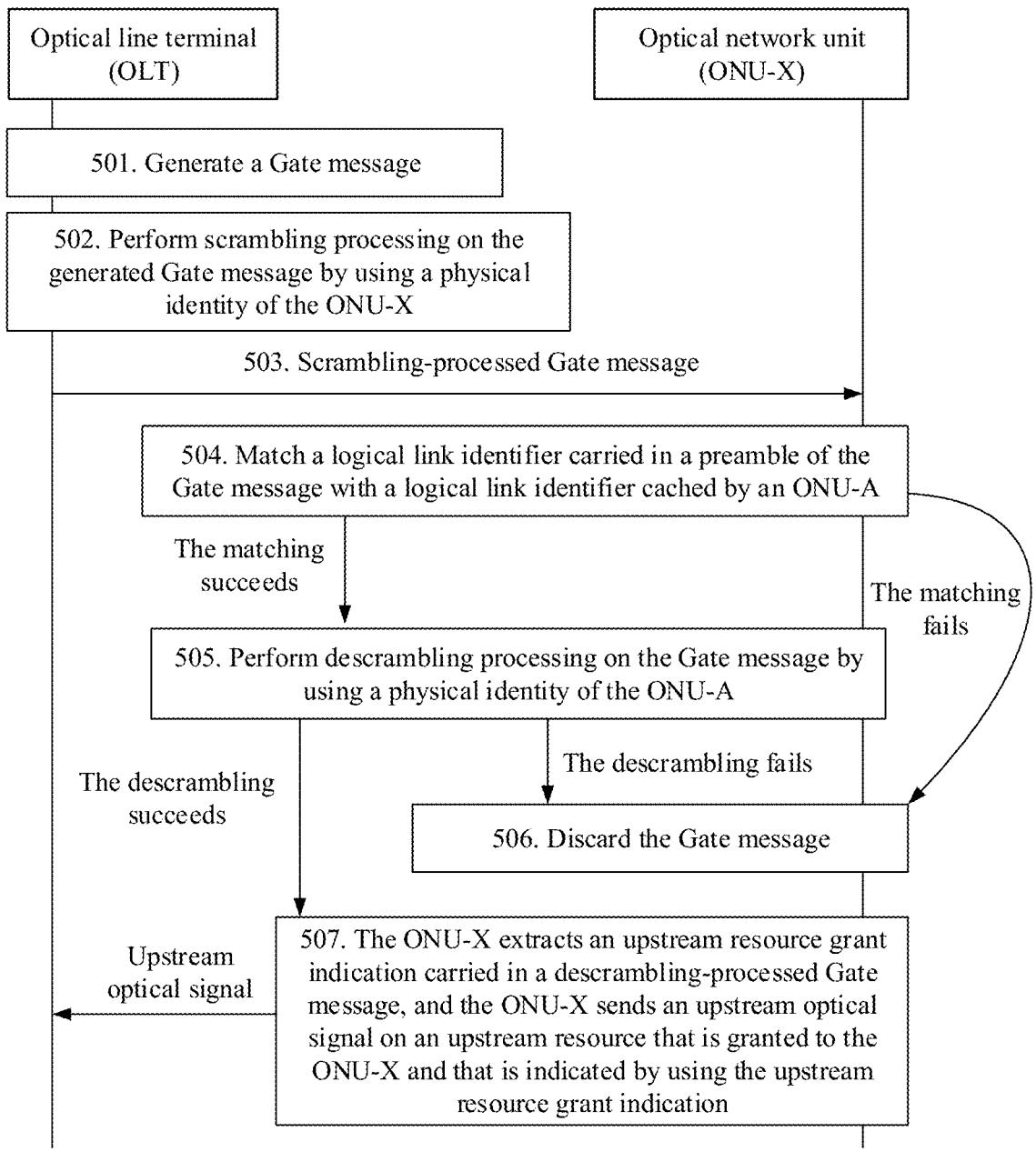
FIG. 5-A

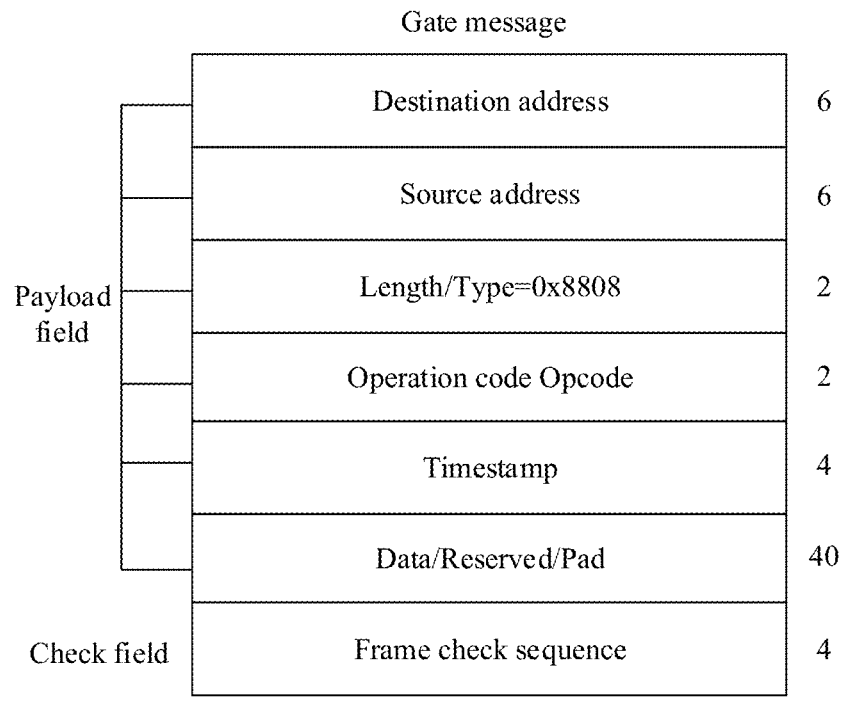
FIG. 5-B
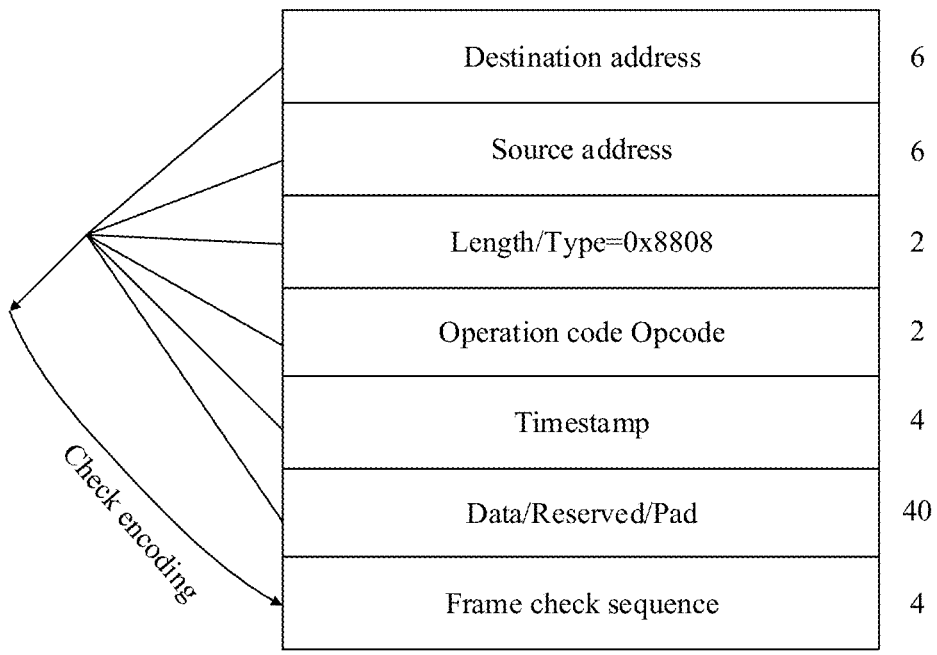
FIG. 5-C

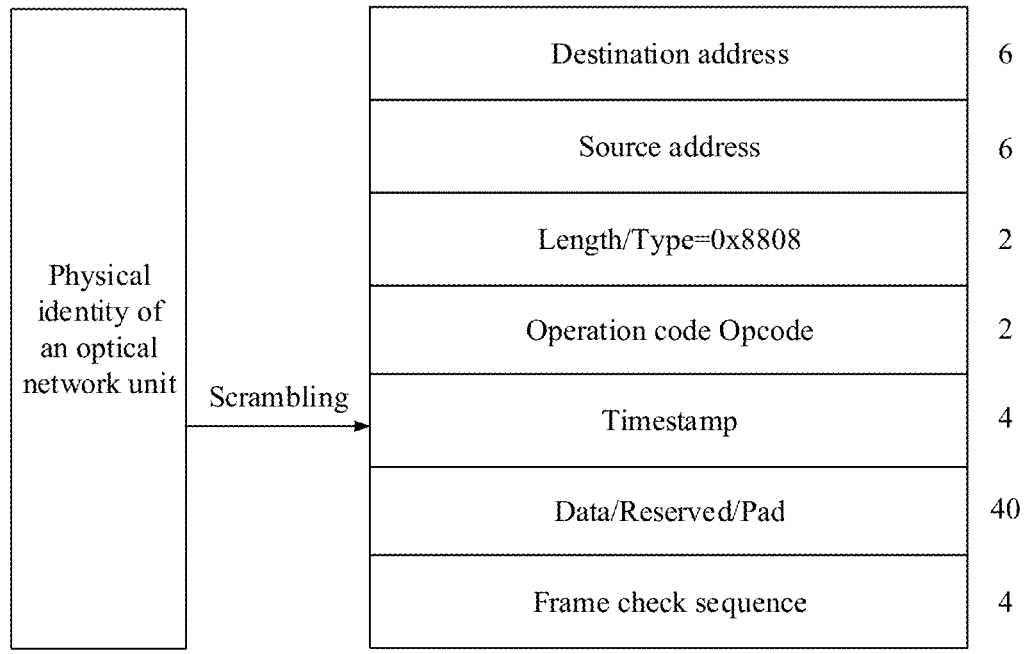
FIG. 5-D
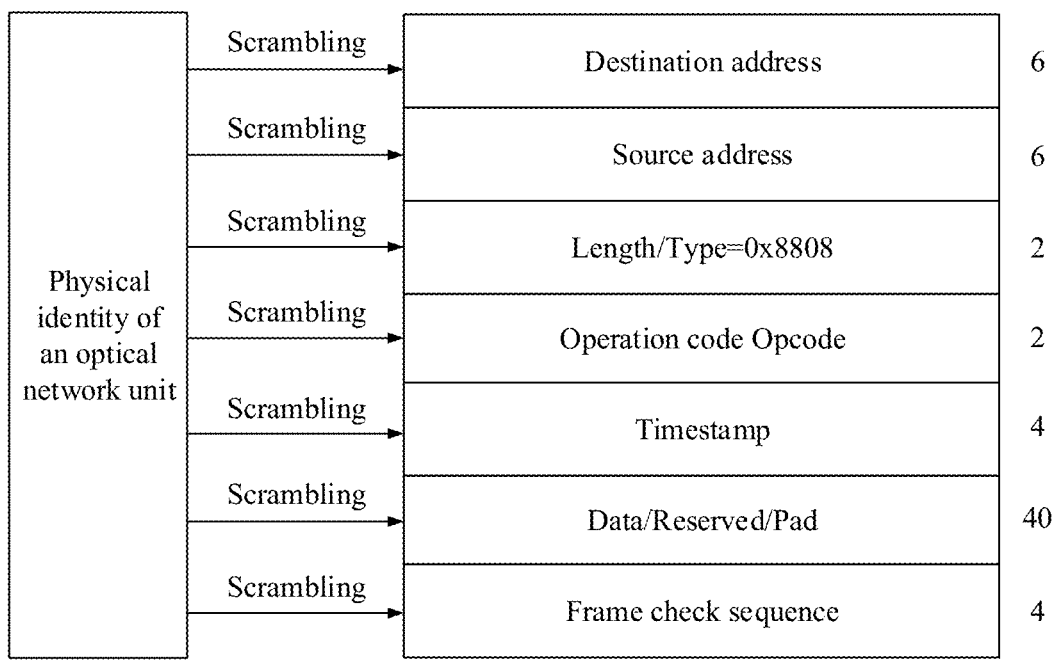
FIG. 5-E

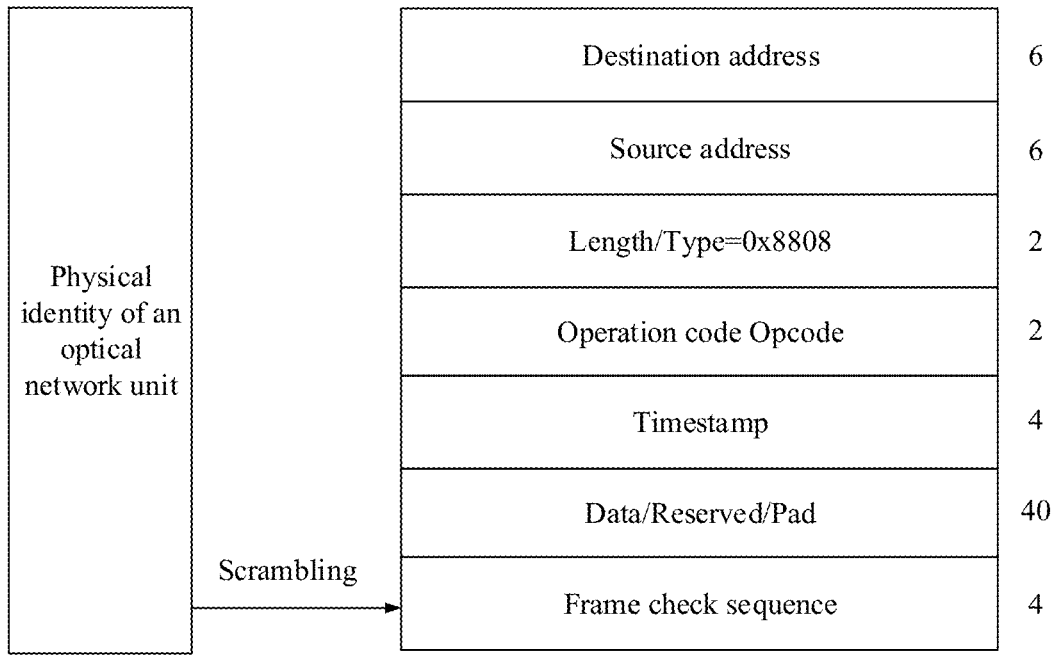
FIG. 5-F
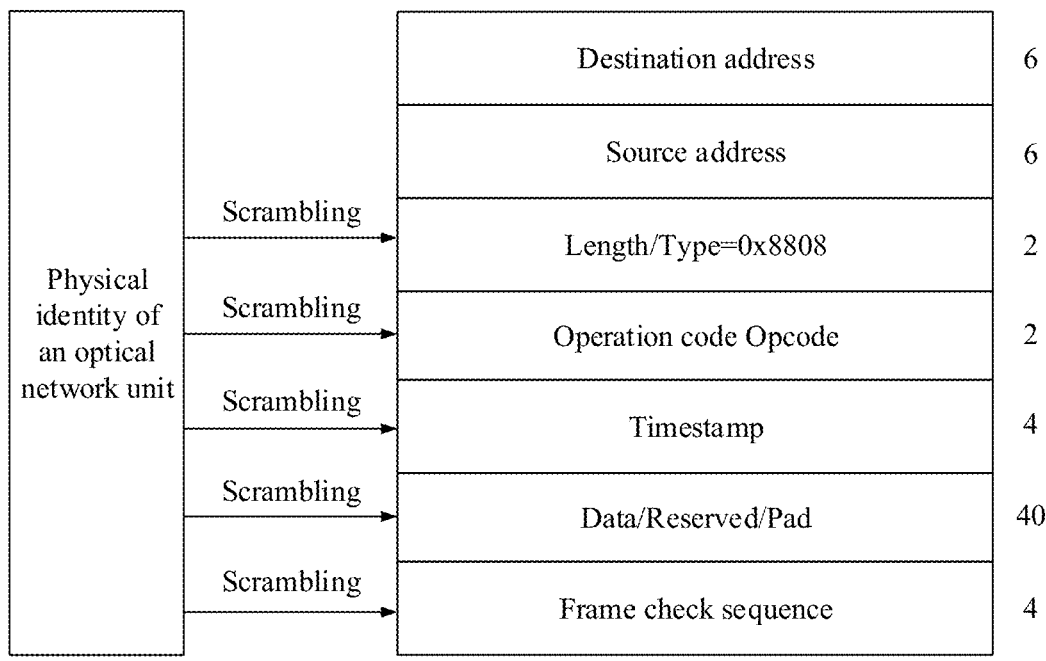
FIG. 5-G

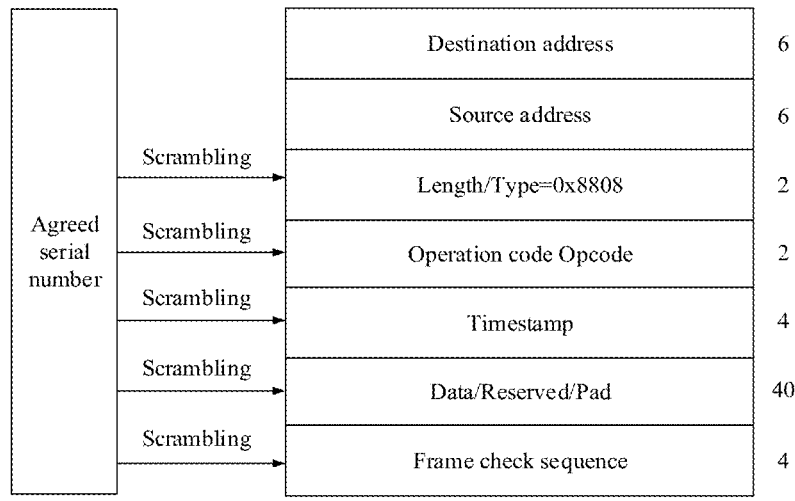
FIG. 5-H
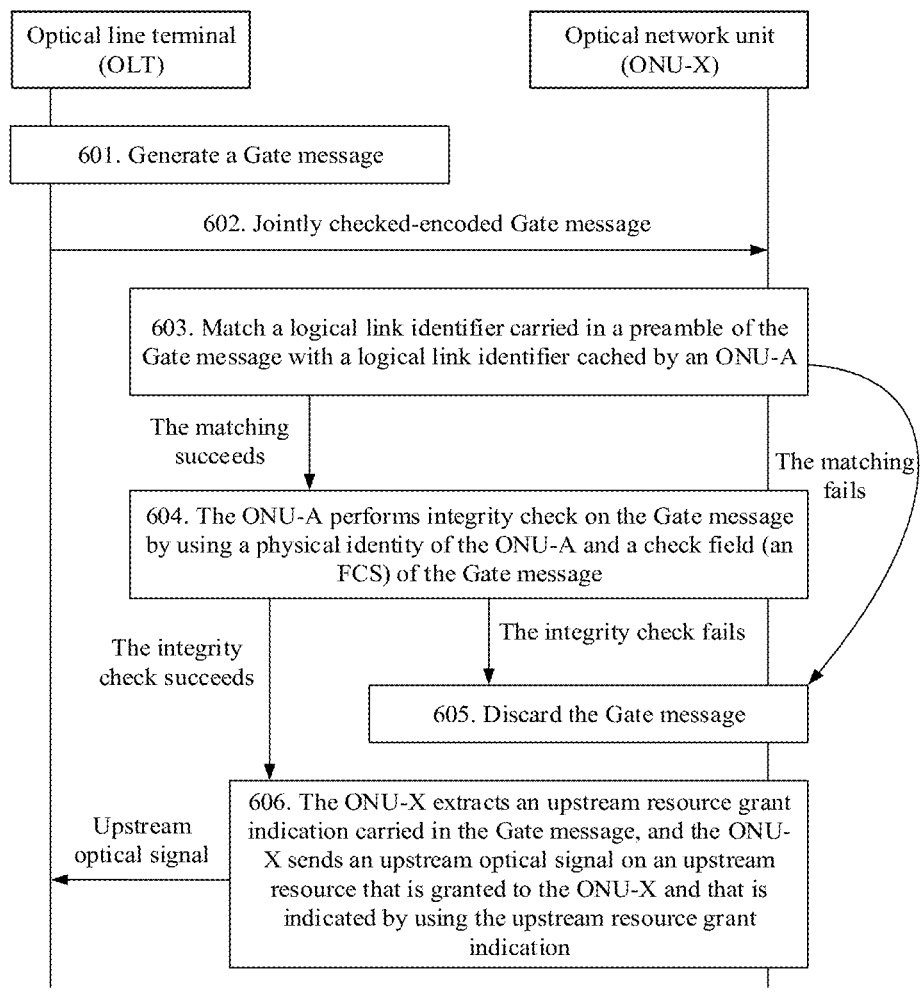
FIG. 6-A

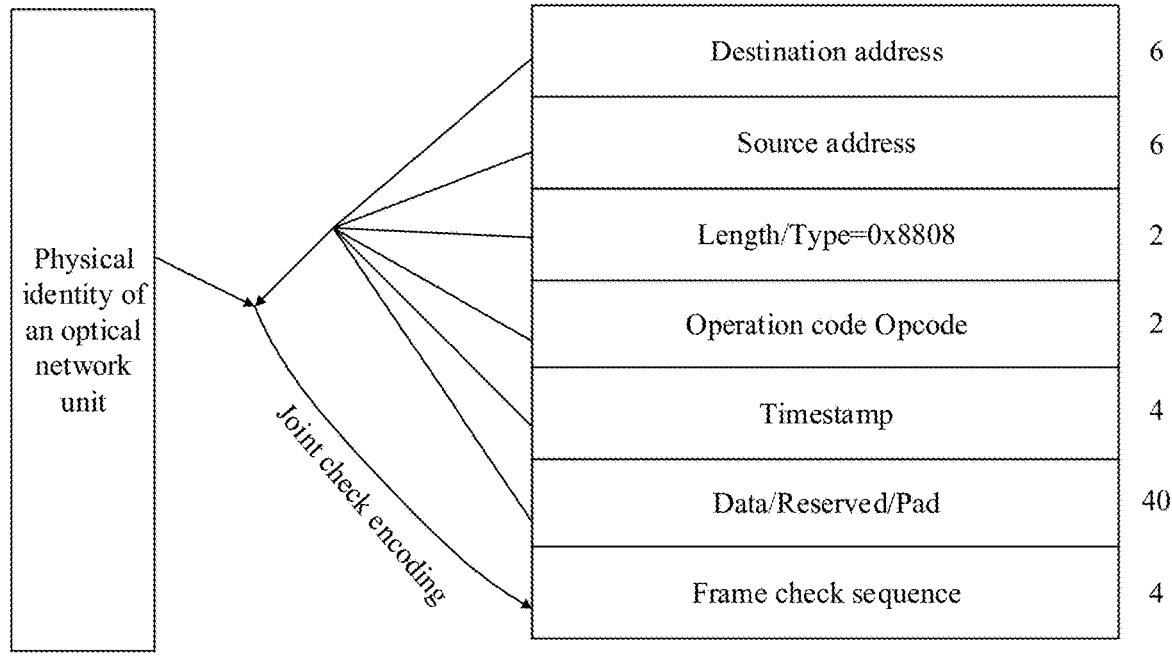
FIG. 6-B
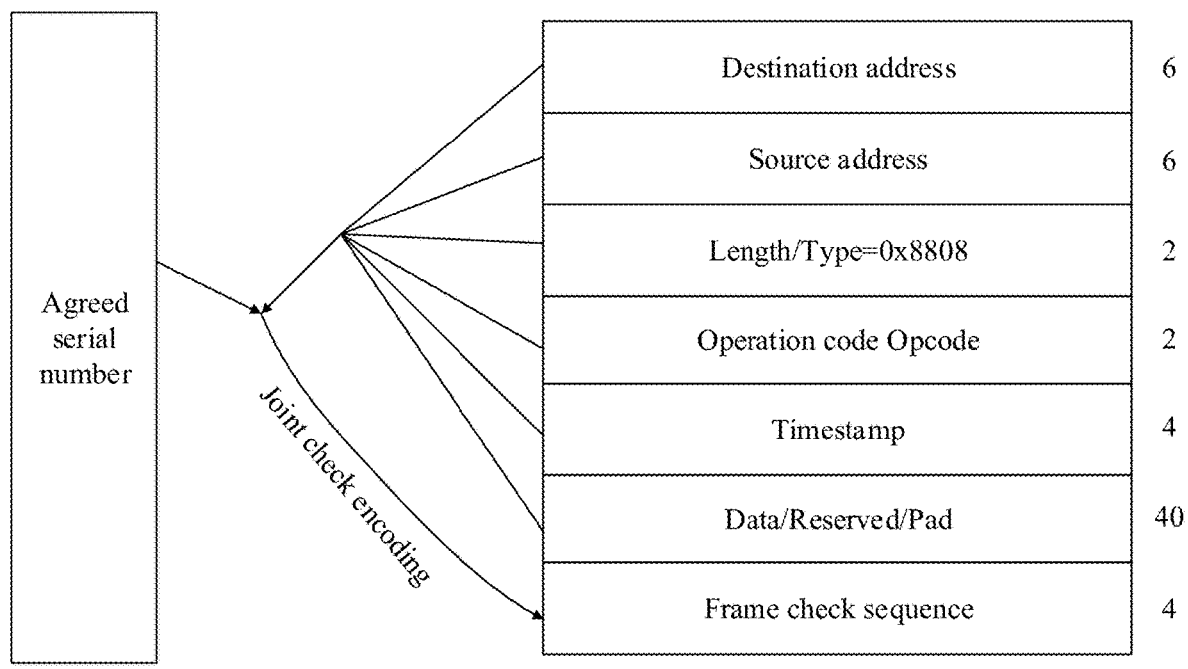
FIG. 6-C

UPSTREAM RESOURCE GRANT METHOD, RELATED DEVICE, AND COMPUTER-READABLE STORAGE MEDIUM

CROSS-REFERENCE TO RELATED APPLICATIONS

This application is a continuation of International Application No. PCT/CN2020/112139, filed on Aug. 28, 2020, which claims priority to Chinese Patent Application No. 201911209201.1, filed on Nov. 30, 2019. The disclosures of the aforementioned applications are hereby incorporated by reference in their entireties.

TECHNICAL FIELD

Embodiments of this application relate to the field of optical communications technologies, and in particular, to an upstream resource grant method, a device, a passive optical network, a computer-readable storage medium, and the like.

BACKGROUND

Currently, there are many common access network broadband solutions for services, such as twisted pair access, coaxial cable access, and fiber access. The twisted pair access technology and the coaxial cable access technology can fully use existing copper wire resources and have low engineering costs, but have difficulty in providing sufficient bandwidth for emerging services such as a video on demand service and a two-way video conference service, and have a limited transmission distance and a small network coverage area. An optical fiber supports a large capacity and long-distance transmission, and therefore fiber access is a desirable solution for broadband access.

Telecommunications services are increasingly rich, users impose increasingly high requirements on bandwidth, and operators at home and abroad already take a fiber to the home (FTTH) mode as an inevitable choice for an access network. The FTTH mode usually needs to depend on a passive optical network (PON) access technology or the like. In the PON access technology, only passive optical components such as an optical splitter and an optical fiber are required between an optical line terminal (OLT) and an optical network unit (ONU) of an access network, without a need to rent an equipment room or provide a power source.

In a practical PON system, a rogue ONU phenomenon often occurs. A rogue ONU is an ONU that emits light not in a specified timeslot or not on a specified wavelength. The ONU that emits light not on a specified wavelength may also be referred to as a cross-wavelength rogue ONU. Because the rogue ONU operates not in its own timeslot and occupies an upstream timeslot of a normal ONU, an OLT cannot normally receive an upstream service sent by another ONU. As a result, the normal ONU loses its service and goes offline.

A relatively large quantity of rogue ONU phenomena greatly affect normal running of a service in a PON system. Therefore, how to effectively reduce an occurrence probability of a rogue ONU phenomenon is a technical subject to be urgently researched by a person skilled in the art.

SUMMARY

Embodiments of this application provide an upstream resource grant method, a device, a passive optical network, a computer-readable storage medium, and the like.

A first aspect of the embodiments of this application provides an upstream resource grant method. The method may include the following.

For example, when an OLT needs to grant an upstream resource to an ONU, the OLT may generate an upstream grant message on which transformation processing has been performed, where a transformation parameter used for the transformation processing includes a physical identity of the ONU (the transformation parameter used for the transformation processing may include another transformation parameter in addition to the physical identity of the ONU: certainly, the transformation parameter used for the transformation processing may alternatively include only the physical identity of the ONU). The OLT sends the upstream grant message on which the transformation processing has been performed. The upstream grant message carries an upstream resource grant indication of the ONU, and the upstream resource grant indication is used to indicate the upstream resource granted to the ONU.

In example solutions of the embodiments of this application, the physical identity of the ONU is used to uniquely identify the ONU. The physical identity of the ONU is globally unique, and different ONUs have different physical identities. The physical identity of the ONU is usually related to a hardware entity of the ONU. The physical identity of the ONU remains unchanged when the ONU is powered off or offline. The physical identity of the ONU includes, for example, one or more of the following identities of the ONU: a device serial number (SN), a media access control (MAC) address, or a key.

Correspondingly, after the ONU receives the upstream grant message on which the transformation processing has been performed and that is sent by the OLT, the ONU performs, by using the transformation parameter including the physical identity of the ONU, inverse transformation processing on the upstream grant message on which the transformation processing has been performed. Successful inverse transformation processing may indicate that the upstream grant message belongs to the ONU that has successfully performed inverse transformation processing, and unsuccessful inverse transformation processing may indicate that the upstream grant message does not belong to the ONU that has successfully performed inverse transformation processing. Successful inverse transformation processing indicates that the physical identity of the ONU used by the OLT to perform transformation processing on the upstream grant message is the same as the physical identity of the ONU that has successfully performed inverse transformation processing, and unsuccessful inverse transformation processing indicates that the physical identity of the ONU used by the OLT to perform transformation processing on the upstream grant message is different from the physical identity of the ONU that has unsuccessfully performed inverse transformation processing. It can be learned that the inverse transformation processing can be used to perform belonging check on the upstream grant message, and when it is verified that the upstream grant message belongs to the ONU, the upstream resource granted by using the upstream grant message should belong to the ONU. When the inverse transformation processing succeeds, the ONU may extract the upstream resource grant indication carried in an upstream grant message on which the inverse transformation processing has been performed, and the ONU sends an upstream optical signal on the upstream resource that is granted to the ONU and that is indicated by using the upstream resource grant indication.

It can be learned that in the foregoing example solution, the OLT sends the upstream grant message on which the transformation processing has been performed, and the transformation parameter used for the transformation processing includes a physical identity of a target ONU (the target ONU is an ONU that the OLT expects to respond to the upstream grant message, that is, a valid ONU (namely, a home ONU) of the upstream grant message, and the OLT grants the upstream resource to the target ONU). In this way, the upstream grant message sent by the OLT implicitly carries the physical identity of the target ONU, that is, interleaving between the upstream grant message and the physical identity of the target ONU is implemented to some extent. Therefore, it means that the upstream grant message on which the transformation processing has been performed implicitly indicates the valid ONU of the upstream grant message, so that the ONU receiving the upstream grant message on which the transformation processing has been performed can check, based on the implicit indication, whether the upstream grant message belongs to the ONU (message belonging check). The ONU uses the upstream resource granted by using the upstream grant message, only when it is verified that the upstream grant message belongs to the ONU. It can be learned that the foregoing technical solution is conducive to improving accuracy of the upstream resource granted by the OLT to the ONU. This definitely helps reduce an occurrence probability of a rogue ONU phenomenon, and further improve service stability of a PON system.

A second aspect of the embodiments of this application provides an upstream resource grant method. The method includes the following.

An ONU receives an upstream grant message on which transformation processing has been performed, where a transformation parameter used for the transformation processing includes a physical identity of an optical network unit. The ONU performs, by using the transformation parameter including the physical identity of the ONU, inverse transformation processing on the upstream grant message on which the transformation processing has been performed. When the inverse transformation processing succeeds, the ONU extracts an upstream resource grant indication carried in an upstream grant message on which the inverse transformation processing has been performed. The ONU sends an upstream optical signal on an upstream resource that is granted to the ONU and that is indicated by using the upstream resource grant indication.

In addition, when the inverse transformation processing fails, for example, the ONU may discard the received upstream grant message on which the transformation processing has been performed.

The inverse transformation processing includes, for example, descrambling processing and/or decryption processing.

It can be learned that in the foregoing example solution, the OLT sends the upstream grant message on which the transformation processing has been performed, and the transformation parameter used for the transformation processing includes a physical identity of a target ONU (the target ONU is an ONU that the OLT expects to respond to the upstream grant message, that is, a valid ONU of the upstream grant message, and the OLT grants the upstream resource to the target ONU). In this way, the upstream grant message sent by the OLT implicitly carries the physical identity of the target ONU, that is, interleaving between the upstream grant message and the physical identity of the target ONU is implemented to some extent. Therefore, it means that the upstream grant message on which the transformation processing has been performed implicitly indicates the valid ONU (namely, a home ONU) of the upstream grant message. The ONU receiving the upstream grant message on which the transformation processing has been performed performs, by using the transformation parameter including the physical identity of the ONU, inverse transformation processing on the upstream grant message on which the transformation processing has been performed, that is, checks, based on the implicit indication, whether the upstream grant message belongs to the ONU (message belonging check). The ONU uses the upstream resource granted by using the upstream grant message, only when it is verified that the upstream grant message belongs to the ONU (that is, the inverse transformation processing succeeds). It can be learned that the foregoing technical solution is conducive to improving accuracy of the upstream resource granted by the OLT to the ONU. This definitely helps reduce an occurrence probability of a rogue ONU phenomenon, and further improve service stability of a PON system.

In the example technical solutions in the first aspect and the second aspect, for example, the OLT may perform transformation processing on some or all fields of the upstream grant message, to generate the upstream grant message on which the transformation processing has been performed. For example, transformation processing is performed on at least some payload fields of the upstream grant message by using the transformation parameter, or transformation processing is performed on a check field of the upstream grant message by using the transformation parameter, or transformation processing is performed on a check field and at least some payload fields of the upstream grant message by using the transformation parameter.

In other words, performing transformation processing on the upstream grant message may include: performing transformation processing on the at least some payload fields of the upstream grant message by using the transformation parameter, or performing transformation processing on the check field of the upstream grant message by using the transformation parameter, or performing transformation processing on the check field and the at least some payload fields of the upstream grant message by using the transformation parameter.

Correspondingly, in other words, performing inverse transformation processing on the upstream grant message may include: performing inverse transformation processing on the at least some payload fields of the upstream grant message by using the transformation parameter, or performing inverse transformation processing on the check field of the upstream grant message by using the transformation parameter, or performing inverse transformation processing on the check field and the at least some payload fields of the upstream grant message by using the transformation parameter.

It can be learned that the foregoing provides a plurality of possible example manners of performing transformation processing on the upstream grant message, and the plurality of manners are conducive to satisfying different complexity requirements in different application scenarios.

Specifically, for example, when the transformation processing is scrambling processing, the scrambling processing may include: performing bitwise multiplication or bitwise exclusive-OR between all to-be-scrambled fields of the upstream grant message and the physical identity of the optical network unit, to obtain a scrambling-processed upstream grant message. A total length of all the to-be-scrambled fields of the upstream grant message is equal to a length of the physical identity of the optical network unit, or a total length of all the to-be-scrambled fields of the upstream grant message is an integer multiple or a non-integer multiple of a length of the physical identity of the optical network unit. All the to-be-scrambled fields are the at least some payload fields of the upstream grant message, or all the to-be-scrambled fields are the check field and the at least some payload fields of the upstream grant message, or all the to-be-scrambled fields are the check field of the upstream grant message.

It may be understood that, when the length of the physical identity of the optical network unit is less than the total length of all the to-be-scrambled fields of the upstream grant message, the physical identity of the optical network unit may be duplicated and spliced according to an agreed rule, to obtain a spliced sequence whose length is equal to the total length of all the to-be-scrambled fields of the upstream grant message; and then bitwise multiplication or bitwise exclusive-OR is performed between the spliced sequence and all the to-be-scrambled fields of the upstream grant message, or between all the to-be-scrambled fields of the upstream grant message and the physical identity of the optical network unit, to obtain the scrambling-processed upstream grant message.

Correspondingly, when the inverse transformation processing is descrambling processing, the descrambling processing may include: performing bitwise multiplication or bitwise exclusive-OR between the physical identity of the optical network unit and all to-be-descrambled fields of the upstream grant message on which the transformation processing has been performed, to obtain a descrambling-processed upstream grant message. A total length of all to-be-scrambled fields of the upstream grant message on which the transformation processing has been performed is equal to a length of the physical identity of the optical network unit, or a total length of all to-be-scrambled fields of the upstream grant message on which the transformation processing has been performed is an integer multiple or a non-integer multiple of a length of the physical identity of the optical network unit.

It may be understood that all the to-be-scrambled fields of the upstream grant message are the same as all the to-be-descrambled fields of the upstream grant message. In other words, all the to-be-descrambled fields are the at least some payload fields of the upstream grant message, or all the to-be-descrambled fields are the check field and the at least some payload fields of the upstream grant message, or all the to-be-descrambled fields are the check field of the upstream grant message.

Specifically, for another example, when the transformation processing is encryption processing, the encryption processing may include: separately performing encryption processing on all to-be-encrypted fields of the upstream grant message by using the physical identity of the optical network unit as a key, to obtain an encryption-processed upstream grant message. All the to-be-encrypted fields are the at least some payload fields of the upstream grant message, or all the to-be-encrypted fields are the check field and the at least some payload fields of the upstream grant message, or all the to-be-encrypted fields are the check field of the upstream grant message.

Correspondingly, when the inverse transformation processing is decryption processing, the decryption processing may include: separately performing decryption processing on all to-be-decrypted fields of the upstream grant message by using the physical identity of the optical network unit as a key, to obtain a decryption-processed upstream grant message.

It may be understood that all the to-be-encrypted fields of the upstream grant message are the same as all the to-be-decrypted fields of the upstream grant message. In other words, all the to-be-decrypted fields are the at least some payload fields of the upstream grant message, or all the to-be-decrypted fields are the check field and the at least some payload fields of the upstream grant message, or all the to-be-decrypted fields are the check field of the upstream grant message.

It is found from practice tests that the foregoing example encryption/scrambling mechanism has relatively low computational complexity, and is conducive to satisfying a plurality of computational complexity requirements in different application scenarios.

The foregoing solutions may be applied to an international telecommunication union (ITU) PON system, an institute of electrical and electronics engineers (IEEE) PON system, or another PON system. When the foregoing solutions are applied to the ITU PON system, the upstream grant message is an Allocation Structure message. When the foregoing solutions are applied to the IEEE PON system, the upstream grant message is a Gate message.

Specifically, for example, when the upstream grant message is an Allocation Structure message, the at least some payload fields of the upstream grant message may include, for example, one or more of the following fields: a Grant Size field, a Start Time field, or an Allocation ID field.

It can be learned that, because the Grant Size field, the Start Time field, and the Allocation ID field of the Allocation Structure message carry grant critical information of the upstream resource, in the foregoing example solution, transformation processing is performed on the fields that carry the grant critical information of the upstream resource. This helps improve privacy of the grant critical information, and helps ensure that only the ONU to which the message belongs can learn of the grant critical information of the upstream resource after related inverse transformation succeeds.

For another example, when the upstream grant message is a Gate message, the at least some payload fields of the upstream grant message may include, for example, a Timestamp field.

It can be learned that, because the Timestamp field of the Gate message carries the upstream resource grant indication, in the foregoing example solution, transformation processing is performed on the field that carries grant critical information of the upstream resource. This helps improve privacy of the grant critical information, and helps ensure that only the ONU to which the message belongs can learn of the grant critical information of the upstream resource after related inverse transformation succeeds.

In some possible implementations, when the upstream grant message is an Allocation Structure message, before the ONU sends the upstream optical signal on the upstream resource that is granted to the ONU and that is indicated by using the upstream resource grant indication, the method may further include: determining that an Allocation Identifier (Allocation-ID) cached by the optical network unit successfully matches an Allocation-ID carried in the upstream grant message on which the inverse transformation processing has been performed. The Allocation-ID cached by the optical network unit may be delivered, for example, by the OLT in advance by using another management message.

In addition, when the Allocation-ID cached by the ONU fails to match the Allocation-ID carried in the upstream grant message, the ONU may discard the upstream grant message.

Successful Allocation-ID matching may be considered as a success of message recheck, that is, an Allocation-ID matching mechanism may be considered as a message belonging rechecking mechanism. The rechecking mechanism helps further improve message belonging accuracy, and helps further reduce the occurrence probability of a rogue ONU phenomenon. Certainly, for some scenarios in which message belonging double-check is not required, the foregoing Allocation-ID matching process may be omitted.

In some other possible implementations, when the upstream grant message is a Gate message, before the ONU sends the upstream optical signal on the upstream resource that is granted to the ONU and that is indicated by using the upstream resource grant indication, the method further includes: determining that a logical link identifier (LLID) cached by the ONU successfully matches an LLID carried in a preamble of the upstream grant message. The LLID cached by the optical network unit may be delivered, for example, by the OLT in advance by using another management message.

In addition, when the LLID cached by the ONU fails to match the LLID carried in the preamble of the upstream grant message, the ONU may discard the upstream grant message.

Successful LLID matching may be considered as a success of message recheck, that is, an LLID matching mechanism may be considered as a message belonging rechecking mechanism. The rechecking mechanism helps further improve message belonging accuracy, and helps further reduce the occurrence probability of a rogue ONU phenomenon. Certainly, for some scenarios in which message belonging double-check is not required, the foregoing LLID matching process may be omitted.

A third aspect of the embodiments of this application provides an upstream resource grant method. The method includes the following.

For example, when an OLT needs to grant an upstream resource to an ONU, the OLT may generate a jointly checked-encoded upstream grant message, where a check field of the jointly checked-encoded upstream grant message is obtained by performing joint check encoding by using a joint check parameter and a payload field of the upstream grant message, and the joint check parameter includes a physical identity of the ONU.

The optical line terminal sends the jointly checked-encoded upstream grant message, where the jointly checked-encoded upstream grant message carries an upstream resource grant indication of the ONU, and the upstream resource grant indication is used to indicate the upstream resource granted to the ONU.

It can be learned that in the foregoing example solution, the OLT sends the jointly checked-encoded upstream grant message, and the joint check parameter used for the joint check encoding includes a physical identity of a target ONU (the target ONU is an ONU that the OLT expects to respond to the upstream grant message, that is, a valid ONU of the upstream grant message, and the OLT grants the upstream resource to the target ONU). In this way, the upstream grant message sent by the OLT implicitly carries the physical identity of the target ONU, that is, interleaving between the upstream grant message and the physical identity of the target ONU is implemented to some extent. Therefore, it means that the jointly checked-encoded upstream grant message implicitly indicates the valid ONU (namely, a home ONU) of the upstream grant message, so that the ONU receiving the jointly checked-encoded upstream grant message can check, based on the implicit indication, whether the upstream grant message belongs to the ONU (message belonging check). The ONU uses the upstream resource granted by using the upstream grant message, only when it is verified that the upstream grant message belongs to the ONU. It can be learned that the foregoing technical solution is conducive to improving accuracy of the upstream resource granted by the OLT to the ONU. This definitely helps reduce an occurrence probability of a rogue ONU phenomenon, and further improve service stability of a PON system.

A fourth aspect of the embodiments of this application provides an upstream resource grant method. The method includes: An ONU receives a jointly checked-encoded upstream grant message, where a check field of the jointly checked-encoded upstream grant message is obtained by performing joint check encoding by using a joint check parameter and a payload field of the upstream grant message, and the joint check parameter includes a physical identity of the optical network unit. The ONU performs integrity check on the jointly checked-encoded upstream grant message by using the joint check parameter including the physical identity of the ONU, and the payload field and the check field of the received jointly checked-encoded upstream grant message.

When the integrity check succeeds, the optical network unit extracts an upstream resource grant indication carried in the upstream grant message, and the optical network unit sends an upstream optical signal on an upstream resource that is granted to the optical network unit and that is indicated by using the upstream resource grant indication.

It can be learned that in the foregoing example solution, the OLT sends the jointly checked-encoded upstream grant message, and the joint check parameter used for the joint check encoding includes a physical identity of a target ONU (the target ONU is an ONU that the OLT expects to respond to the upstream grant message, that is, a valid ONU of the upstream grant message, and the OLT grants the upstream resource to the target ONU). In this way, the upstream grant message sent by the OLT implicitly carries the physical identity of the target ONU, that is, interleaving between the upstream grant message and the physical identity of the target ONU is implemented to some extent. Therefore, it means that the jointly checked-encoded upstream grant message implicitly indicates the valid ONU (namely, a home ONU) of the upstream grant message, so that the ONU receiving the jointly checked-encoded upstream grant message performs integrity check on the jointly checked-encoded upstream grant message by using the joint check parameter including the physical identity of the ONU, and the payload field and the check field of the received jointly checked-encoded upstream grant message, that is, checks, based on the implicit indication, whether the upstream grant message belongs to the ONU (message belonging check). The ONU uses the upstream resource granted by using the upstream grant message, only when it is verified that the upstream grant message belongs to the ONU (that is, the integrity check succeeds, or in other words, the message belonging check succeeds). It can be learned that the foregoing technical solution is conducive to improving accuracy (target-ability) of the upstream resource granted by the OLT to the ONU. This definitely helps reduce an occurrence probability of a rogue ONU phenomenon, and further improve service stability of a PON system.

The example solutions in the third aspect and the fourth aspect may be applied to an ITU PON system, an IEEE PON system, or another PON system. When the foregoing solutions are applied to the ITU PON system, the upstream grant message is an Allocation Structure message. When the foregoing solutions are applied to the IEEE PON system, the upstream grant message is a Gate message.

In some possible implementations, when the upstream grant message is an Allocation Structure message, before the ONU sends the upstream optical signal on the upstream resource that is granted to the ONU and that is indicated by using the upstream resource grant indication, the method further includes: determining that an Allocation Identifier (Allocation-ID) cached by the ONU successfully matches an Allocation-ID carried in the Allocation Structure message. The Allocation-ID cached by the optical network unit may be delivered, for example, by the OLT in advance by using another management message.

In addition, when the Allocation-ID cached by the ONU fails to match the Allocation-ID carried in the upstream grant message, the ONU may discard the upstream grant message.

Successful Allocation-ID matching may be considered as a success of message recheck, that is, an Allocation-ID matching mechanism may be considered as a message belonging rechecking mechanism. The rechecking mechanism helps further improve message belonging accuracy, and helps further reduce the occurrence probability of a rogue ONU phenomenon. Certainly, for some scenarios in which message belonging double-check is not required, the foregoing Allocation-ID matching process may be omitted.

In some other possible implementations, when the upstream grant message is a Gate message, before the ONU sends the upstream optical signal on the upstream resource that is granted to the ONU and that is indicated by using the upstream resource grant indication, the method further includes: determining that a logical link identifier (LLID) cached by the ONU successfully matches an LLID carried in a preamble of the Gate message. The LLID cached by the optical network unit may be delivered, for example, by the OLT in advance by using another management message.

In addition, when the LLID cached by the ONU fails to match the LLID carried in the preamble of the upstream grant message, the ONU may discard the upstream grant message.

Successful LLID matching may be considered as a success of message recheck, that is, an LLID matching mechanism may be considered as a message belonging rechecking mechanism. The rechecking mechanism helps further improve message belonging accuracy, and helps further reduce the occurrence probability of a rogue ONU phenomenon. Certainly, for some scenarios in which message belonging double-check is not required, the foregoing LLID matching process may be omitted.

A fifth aspect of the embodiments of this application provides an optical line terminal. The optical line terminal may include a generation unit and a communications unit.

The generation unit is configured to generate an upstream grant message on which transformation processing has been performed, where a transformation parameter used for the transformation processing includes a physical identity of an optical network unit.

The communications unit is configured to send the upstream grant message on which the transformation processing has been performed, where the upstream grant message carries an upstream resource grant indication of the optical network unit, and the upstream resource grant indication is used to indicate an upstream resource granted to the optical network unit.

For specific implementation details of functions of the units or modules in the optical line terminal provided in the fifth aspect, refer to related detailed descriptions of the upstream resource grant method provided in the first aspect.

A sixth aspect of the embodiments of this application provides an optical network unit. The optical network unit may include an inverse transformation unit and a communications unit.

The communications unit is configured to receive an upstream grant message on which transformation processing has been performed, where a transformation parameter used for the transformation processing includes a physical identity of the optical network unit.

The inverse transformation unit is configured to perform, by using the transformation parameter including the physical identity of the optical network unit, inverse transformation processing on the upstream grant message on which the transformation processing has been performed.

The communications unit is further configured to: when the inverse transformation processing succeeds, extract an upstream resource grant indication carried in an upstream grant message on which the inverse transformation processing has been performed, and send an upstream optical signal on an upstream resource that is granted to the optical network unit and that is indicated by using the upstream resource grant indication.

For specific implementation details of functions of the units or modules in the optical network unit provided in the sixth aspect, refer to related detailed descriptions of the upstream resource grant method provided in the second aspect.

A seventh aspect of the embodiments of this application provides an optical line terminal. The optical line terminal may include a generation unit and a communications unit.

The generation unit is configured to generate a jointly checked-encoded upstream grant message, where a check field of the jointly checked-encoded upstream grant message is obtained by performing joint check encoding by using a joint check parameter and a pay load field of the upstream grant message, and the joint check parameter includes a physical identity of an optical network unit.

The communications unit is configured to send the jointly checked-encoded upstream grant message, where the jointly checked-encoded upstream grant message carries an upstream resource grant indication of the optical network unit, and the upstream resource grant indication is used to indicate an upstream resource granted to the optical network unit.

For specific implementation details of functions of the units or modules in the optical line terminal provided in the seventh aspect, refer to related detailed descriptions of the upstream resource grant method provided in the third aspect.

An eighth aspect of the embodiments of this application provides an optical network unit. The optical network unit may include a check unit and a communications unit.

The communications unit is configured to receive a jointly checked-encoded upstream grant message, where a check field of the jointly checked-encoded upstream grant message is obtained by performing joint check encoding by using a joint check parameter and a pay load field of the upstream grant message, and the joint check parameter includes a physical identity of the optical network unit.

The check unit is configured to perform integrity check on the jointly checked-encoded upstream grant message by using the joint check parameter including the physical identity of the optical network unit, and the payload field and the check field of the received jointly checked-encoded upstream grant message.

The communications unit is further configured to: when the integrity check succeeds, extract an upstream resource grant indication carried in the upstream grant message, and send an upstream optical signal on an upstream resource that is granted to the optical network unit and that is indicated by using the upstream resource grant indication.

For specific implementation details of functions of the units or modules in the optical network unit provided in the eighth aspect, refer to related detailed descriptions of the upstream resource grant method provided in the fourth aspect.

A ninth aspect of the embodiments of this application provides an optical line terminal, including an optical module and a processor and/or MAC chip coupled to the optical module. The processor and/or MAC chip are/is configured to perform some or all steps of any method that is performed by the optical line terminal and that is in the embodiments of this application.

A tenth aspect of the embodiments of this application provides an optical network unit, including an optical module and a processor and/or MAC chip coupled to the optical module. The processor and/or MAC chip are/is configured to perform some or all steps of any method that is performed by the optical network unit and that is in the embodiments of this application.

An eleventh aspect of the embodiments of this application provides a passive optical network. The passive optical network includes the optical line terminal provided in the ninth aspect and the optical network unit provided in the tenth aspect.

A twelfth aspect of the embodiments of this application provides a computer-readable storage medium. The computer-readable storage medium stores a computer program. When the computer program is executed by hardware, some or all steps of any method that is performed by an optical network unit and that is in the embodiments of this application can be implemented.

A thirteenth aspect of the embodiments of this application provides a computer-readable storage medium. The computer-readable storage medium stores a computer program. When the computer program is executed by hardware, some or all steps of any method that is performed by an optical line terminal and that is in the embodiments of this application can be implemented.

A fourteenth aspect of the embodiments of this application provides a computer program product including instructions. When the computer program product is run on an optical network unit, the optical network unit is enabled to perform some or all steps of the methods that are performed by the optical network unit and that are in the foregoing aspects.

A fifteenth aspect of the embodiments of this application provides a computer program product including instructions. When the computer program product is run on an optical line terminal, the optical line terminal is enabled to perform some or all steps of the methods that are performed by the optical line terminal and that are in the foregoing aspects.

A sixteenth aspect of the embodiments of this application provides an optical communications apparatus (where the communications apparatus may be used in an OLT or an ONU). The optical communications apparatus may include at least one input end, a signal processor, and at least one output end. The signal processor is configured to perform some or all steps of any method in the foregoing aspects.

A seventeenth aspect of the embodiments of this application provides an optical communications apparatus (where the communications apparatus may be used in an OLT or an ONU). The optical communications apparatus may include an input interface circuit, a logic circuit, and an output interface circuit. The logic circuit is configured to perform some or all steps of any method that may be performed by the OLT or the ONU and that is in the embodiments of this application.

BRIEF DESCRIPTION OF DRAWINGS

The following describes some accompanying drawings in embodiments of this application.

FIG. 1-A is a schematic architectural diagram of a PON system according to an embodiment of this application:

FIG. 1-B is a schematic diagram of downstream transmission of a PON system according to an embodiment of this application:

FIG. 1-C is a schematic diagram of upstream transmission of a PON system according to an embodiment of this application:

FIG. 1-D is a schematic diagram illustrating cause analyses of a rogue ONU occurrence according to an embodiment of this application:

FIG. 1-E is an example schematic flowchart of an upstream resource grant method according to an embodiment of this application:

FIG. 1-F is an example schematic diagram of a physical identity table of an ONU according to an embodiment of this application:

FIG. 1-G is an example schematic diagram of performing check encoding on a payload field of an upstream grant message to obtain a check field of the upstream grant message according to an embodiment of this application;

FIG. 2-A is an example schematic flowchart of another upstream resource grant method according to an embodiment of this application;

FIG. 2-B is an example schematic diagram of joint check encoding for an upstream grant message according to an embodiment of this application:

FIG. 3-A is an example schematic flowchart of another upstream resource grant method according to an embodiment of this application:

FIG. 3-B is an example schematic diagram of a format of an Allocation Structure message according to an embodiment of this application:

FIG. 3-C is an example schematic diagram of performing check encoding on a payload field of an Allocation Structure message to obtain a check field of the Allocation Structure message according to an embodiment of this application:

FIG. 3-D to FIG. 3-I are example schematic diagrams of several Allocation Structure message scrambling manners according to this application:

FIG. 3-J is an example schematic diagram of an Allocation Structure message descrambling manner according to this application:

FIG. 3-K is an example schematic diagram of an Allocation Structure message scrambling manner according to this application:

FIG. 4-A is an example schematic flowchart of another upstream resource grant method according to an embodiment of this application:

FIG. 4-B and FIG. 4-C are two example schematic diagrams of joint check encoding for an Allocation Structure message according to an embodiment of this application:

FIG. 5-A is an example schematic flowchart of another upstream resource grant method according to an embodiment of this application:

FIG. 5-B is an example schematic diagram of a format of a Gate message according to this application:

FIG. 5-C is an example schematic diagram of performing check encoding on a payload field of a Gate message to obtain a check field of the Gate message according to an embodiment of this application:

FIG. 5-D to FIG. 5-H are example schematic diagrams of several Gate message scrambling manners according to this application:

FIG. 6-A is an example schematic flowchart of another upstream resource grant method according to an embodiment of this application;

FIG. 6-B and FIG. 6-C are two example schematic diagrams of joint check encoding for a Gate message according to an embodiment of this application:

DESCRIPTION OF EMBODIMENTS

Figure 7:
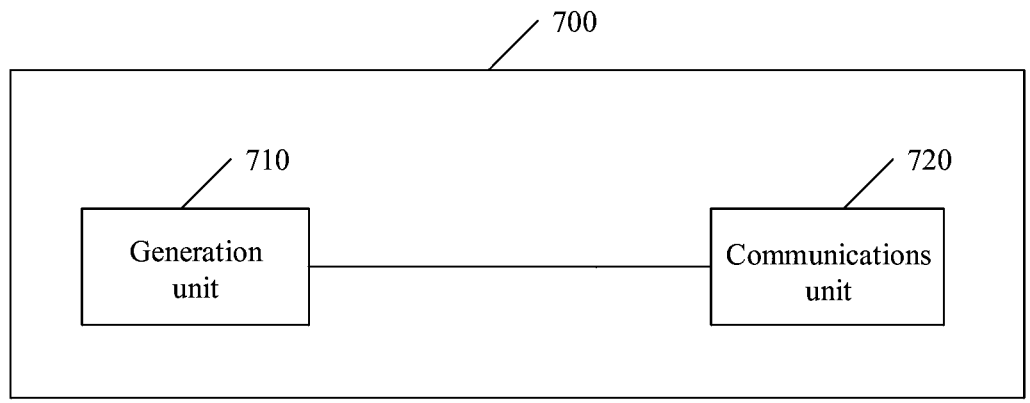
FIG. 7 is an example schematic diagram of a structure of an optical line terminal according to an embodiment of this application.

The following describes solutions in the embodiments of this application with reference to the accompanying drawings in the embodiments of this application.

FIG. 1-A is a schematic architectural diagram of a PON system. The PON system includes an OLT (also referred to as a central office end) and an ONU (also referred to as a user end). Only passive optical components such as an optical fiber and a passive optical splitter need to be coupled between the OLT and the ONU. The splitter may be an abbreviation of an optical splitter.

The OLT is coupled to the splitter through a feeder fiber, and the feeder is also referred to as a feeder section. The splitter may couple a plurality of optical fibers together. The splitter is coupled to the ONU through a drop fiber, and the drop fiber is also referred to as an attenuation section.

A direction from the OLT to the ONU is referred to as a downstream direction, and a direction from the ONU to the OLT is referred to as an upstream direction. During data sending and receiving, a broadcast form is used in the downstream direction of the PON network, and a unicast form is used in the upstream direction of the PON network.

FIG. 1-B is a schematic diagram of downstream transmission of a PON system. Specifically, one optical signal delivered by the OLT is divided by the splitter into N optical signals, and the N optical signals are sent simultaneously to all ONUs. Each ONU selectively receives a downstream optical signal whose ID number is the same as that of the ONU and discards other optical signals.

FIG. 1-C is a schematic diagram of upstream transmission of a PON system. Specifically, the N incoming optical signals of the ONUs are combined into one optical signal by using a time division multiple access (TDMA) technology. A principle of the TDMA technology is as follows: An upstream transmission time is divided into several timeslots Ti (where i=1, 2, 3, . . . , 32, . . . ), and in each upstream timeslot, only one ONU is arranged to send an upstream optical signal to the OLT in a packet manner, and the ONUs successively send the upstream optical signals in a sequence specified by the OLT. In this case, the upstream timeslot is an upstream resource. The TDMA imposes the following requirements: After measuring a distance between the OLT and each ONU, the OLT needs to perform strict sending timing for each ONU. Each ONU obtains a timing timeslot (also referred to as a grant timeslot, an upstream grant timeslot, an upstream timing timeslot, an upstream timeslot, or the like) from an upstream grant message sent by the OLT, and sends the upstream optical signal in the timing timeslot specified by the OLT, to avoid a conflict between the ONUs. A PON based on this principle is referred to as a TDM-PON.

In the TDM-PON network, each ONU can send an upstream optical signal only in its grant timeslot and keeps its transmitter disabled in other time. Otherwise, if a plurality of ONUs simultaneously transmit upstream optical signals, a conflict occurs, and the upstream optical signals interfere with each other. Consequently, the OLT fails to correctly receive normal data from any other ONUs, and all services of the entire PON network may be interrupted. If this case occurs, an ONU that arbitrarily sends an upstream optical signal beyond its grant timeslot is referred to as a rogue ONU. To ensure normal running of the TDM-PON, the OLT strictly allocates a different grant timeslot to each ONU, to avoid a rogue ONU occurrence.

According to the principle of the PON system, a rogue ONU should not appear in the PON system. However, in a practical PON system, a rogue ONU phenomenon often occurs. Because a rogue ONU operates not in its own timeslot and occupies an upstream timeslot of a normal ONU, an OLT cannot normally receive an upstream service sent by another ONU. As a result, the normal ONU loses its service and goes offline. The inventor of this application obtains, through extensive analysis, distribution of causes of the rogue ONU phenomenon in live networks. For the distribution of various causes of the rogue ONU phenomenon, refer to examples in FIG. 1-D.

According to researches, the inventor of this application finds that an ID occupation phenomenon accounts for the largest proportion among various rogue ONU phenomena. For example, in an ITU PON system (G-PON, XG-PON, XGS-PON, or NG-PON2), an upstream grant timeslot of an ONU is allocated by the OLT. The upstream timeslot granted by the OLT is identified by an Allocation ID. Correspondingly, the ONU determines, by identifying whether the Allocation-ID carried in an Allocation Structure message belongs to the ONU, whether the upstream timeslot granted by using the Allocation Structure message belongs to the ONU. If the ONU identifies that the Allocation-ID carried in the Allocation Structure message belongs to the ONU (that is, the Allocation-ID carried in this message is the same as an Allocation-ID in at least one Allocation-ID cached by the ONU), the ONU considers that the upstream timeslot granted by using the Allocation Structure message belongs to the ONU (that is, the upstream timeslot is granted to the ONU).

Allocation-IDs are collectively allocated by the OLT to all the ONUs in advance. After receiving the Allocation-IDs, the ONUs cache the Allocation-IDs locally, and the OLT records a correspondence between the Allocation-IDs and the ONUs. The Allocation-IDs are allocated and recorded by using software. In some cases, for example, when the OLT finds that an ONU-A goes offline after being powered off, all Allocation-IDs of the ONU-A are released by the OLT, and the OLT may allocate the released Allocation-IDs to another ONU (for example, an ONU-B). Afterwards, the OLT needs to allocate an upstream timeslot to the ONU-B based on these Allocation-IDs. If the ONU-A is restarted but the ONU-A has not discarded these Allocation-IDs that are allocated by the OLT to the ONU-A before being powered off, when an Allocation Structure message sent by the OLT carries these Allocation-IDs, both the ONU-A and the ONU-B consider that a grant timeslot allocated by using the Allocation Structure message belongs to the ONU-A and ONU-B themselves. Then, the two ONUs may simultaneously respond to the Allocation Structure message and send upstream optical signals; in this case, the ONU-A affects upstream optical signal sending of the other ONU (that is, the ONU-B). As a result, a rogue ONU phenomenon occurs (the ONU-A is a rogue ONU in this case). Causes of a rogue ONU phenomenon in the ITU PON system are similar to those described above.

A rogue ONU phenomenon caused by a failure of releasing, by an ONU in time, an Allocation-ID that currently does not belong to the ONU may be referred to as a rogue ONU phenomenon caused by ID occupation.

For the rogue ONU phenomenon caused by ID occupation, a possible solution is as follows: After the ONU is powered off and goes offline, a software control manner is used to enable the ONU to discard all Allocation-IDs previously allocated to the ONU, or the OLT indicates, by using a management message, the ONU to discard all Allocation-IDs previously allocated to the ONU. However, because there are many ONU manufacturers, if an ONU produced by each manufacturer is designed based on its own understanding of a standard, but the current standard imposes no mandatory requirement on related designs, the foregoing manners cannot resolve the problem desirably.

The following further describes other solutions.

FIG. 1-E is an example schematic flowchart of an upstream resource grant method according to an embodiment of this application. This embodiment is targeted for a transformation processing scenario.

In an example shown in FIG. 1-E, the upstream resource grant method may include the following steps.

101. When an OLT needs to grant an upstream resource to an ONU (which is denoted, for example, as an ONU-X for ease of description), the OLT generates an upstream grant message.

The upstream grant message is used to grant the upstream resource to the ONU-X. Specific names of upstream grant messages may be different in different networks. For example, in an IEEE PON system, the upstream grant message is a Gate message. In an ITU PON system, the upstream grant message is an Allocation Structure message. In another network, the upstream grant message may have another name.

The upstream resource mentioned in the embodiments of this application is usually an upstream timeslot, and therefore the upstream resource and the upstream timeslot are used interchangeably sometimes.

The upstream grant message carries an upstream resource grant indication of the ONU-X, and the upstream resource grant indication is used to indicate the upstream resource granted to the ONU-X. In upstream grant messages with different specific names, fields that carry upstream resource grant indications may be different. For example, when the upstream grant message is an Allocation Structure message, the upstream resource grant indication may be carried in a Start Time field and a Grant Size field of the Allocation Structure message. For example, when the upstream grant message is a Gate message, the upstream resource grant indication may be carried in a Timestamp field of the Gate message. The same rule may apply to other network scenarios.

The upstream grant message includes a check field and a payload field, and the upstream resource grant indication is carried in the payload field of the upstream grant message. Refer to FIG. 1-G. The payload field of the upstream grant message may be obtained by performing check encoding on the payload field of the upstream grant message. The check field may be used by a receive end to perform integrity check on the payload field of the upstream grant message. When it is found that a 1-bit error code or a 2-bit error code occurs in the payload field, error correction may be performed by using the check field. This can improve an error tolerance characteristic of the upstream grant message for a transmission error code.

It may be understood that the payload field may be considered as being relative to the check field. Therefore, other fields of the upstream grant message that need to be used to obtain the check field by performing check encoding may be referred to as the payload field, and the payload field may also be referred to as a non-check field or a check reference field.

The payload field is unnecessarily equivalent to a field named "payload". For example, the field named "payload" may be only one type of payload field in this embodiment of this application.

102. The OLT performs transformation processing on the generated upstream grant message to obtain an upstream grant message on which the transformation processing has been performed.

A transformation parameter used for the transformation processing includes a physical identity of the ONU-X. Inverse transformation processing is performed, by using the transformation parameter, on the upstream grant message on which the transformation processing has been performed, so that the upstream grant message on which the transformation processing has not been performed can be restored.

The physical identity of the ONU mentioned in the embodiments of this application is any identity that can be used to uniquely identify the ONU. For example, the physical identity of the ONU may include one or more of the following identities of the ONU: a media access control (MAC) address, a device serial number (SN), or a key:

In this embodiment of this application, the OLT may cache a physical identity of each ONU in advance. Specifically, for example, the OLT may cache the physical identity of each ONU in a physical identity table or another data structure. An example of a physical identity table is shown in FIG. 1-F. The OLT may read a physical identity of a corresponding ONU from the physical identity table based on a requirement, and perform transformation processing on the generated upstream grant message by using the read physical identity of the ONU.

It may be understood that, the performing, by the OLT, transformation processing on the generated upstream grant message may be specifically performing transformation processing on some or all fields of the upstream grant message. Specifically, for example, transformation processing is performed on at least some payload fields of the upstream grant message by using the transformation parameter, or transformation processing is performed on the check field of the upstream grant message by using the transformation parameter, or transformation processing is performed on the check field and at least some payload fields of the upstream grant message by using the transformation parameter.

It may be understood that there may be a variety of specific transformation processing manners. For example, the transformation processing may include scrambling processing and/or encryption processing. Inverse transformation processing corresponding to the scrambling processing is descrambling processing, and inverse transformation processing corresponding to the encryption processing is decryption processing.

103. The OLT sends the upstream grant message on which the transformation processing has been performed.

104. The ONU-X receives the upstream grant message on which the transformation processing has been performed. The transformation parameter used for the transformation processing includes the physical identity of the ONU-X. The ONU-X performs, by using the transformation parameter (including the physical identity of the ONU-X), inverse transformation processing on the upstream grant message on which the transformation processing has been performed.

The transformation parameter used for the transformation processing may include only the physical identity of the ONU-X, or may include not only the physical identity of the ONU-X but also one or more other transformation parameters. The one or more other transformation parameters mentioned herein are not limited in this application.

105. When the inverse transformation processing succeeds, the ONU-X extracts the upstream resource grant indication carried in an upstream grant message on which the inverse transformation processing has been performed, and the ONU-X sends an upstream optical signal on the upstream resource that is granted to the ONU-X and that is indicated by using the upstream resource grant indication.

It may be understood that, if another ONU (which may be referred to as an ONU-Y for ease of description) different from the ONU-X also receives the upstream grant message on which the transformation processing has been performed. The ONU-Y also performs, by using the transformation parameter (including a physical identity of the ONU-Y), inverse transformation processing on the upstream grant message on which the transformation processing has been performed. Because the transformation parameter for the upstream grant message on which the transformation processing has been performed does not include the physical identity of the ONU-Y, the ONU-Y fails to perform inverse transformation processing on the upstream grant message by using the physical identity of the ONU-Y. The failure indicates that the upstream resource granted by using the upstream grant message is not allocated to the ONU-Y. In this case, the ONU-Y may discard the upstream grant message. This is the same for other ONUs.

It can be learned that in the foregoing example solution, the OLT sends the upstream grant message on which the transformation processing has been performed, and the transformation parameter used for the transformation processing includes a physical identity of a target ONU (namely, the ONU-X, where the target ONU is an ONU that the OLT expects to respond to the upstream grant message, that is, a valid receive end of the upstream grant message). In this way, the upstream grant message sent by the OLT implicitly carries the physical identity of the target ONU, that is, interleaving between the upstream grant message and the physical identity of the target ONU is implemented to some extent. The ONU receiving the upstream grant message needs to perform inverse transformation processing by using the same physical identity, so that the upstream grant message on which the transformation processing has not been performed can be successfully restored through inverse transformation processing. The physical identity of the ONU is globally unique, and different ONUs have different physical identities. In addition, the physical identity of the ONU may be related to a hardware entity of the ONU, and remains unchanged when the ONU is powered off or offline. Therefore, each ONU can successfully restore, through corresponding inverse transformation processing, an upstream grant message sent to the ONU, but cannot successfully restore, through corresponding inverse transformation processing, an upstream grant message that is not sent to the ONU. This is conducive to isolation of upstream grant messages between different ONUs. In this case, even if an ONU does not release, in time, an Allocation ID that currently does not belong to the ONU, the ONU is not to respond to an upstream grant message that does not belong to the ONU. In other words, the ONU is not to use an upstream resource granted by using the upstream grant message that does not belong to the ONU (because when the ONU receives the upstream grant message that does not belong to the ONU, the ONU cannot successfully restore, by using a physical identity of the ONU through inverse transformation processing, the upstream grant message that does not belong to the ONU). It can be learned that the foregoing solution helps reduce an occurrence probability of a rogue ONU phenomenon, and further improve service stability of a PON system.

FIG. 2-A is an example schematic flowchart of another upstream resource grant method according to an embodiment of this application. This embodiment is mainly targeted for a joint check encoding scenario.

In an example shown in FIG. 2-A, the another upstream resource grant method may include the following steps.

201. When an OLT needs to grant an upstream resource to an ONU (which is denoted, for example, as an ONU-X for ease of description), the OLT generates a jointly checked-encoded upstream grant message.

The upstream grant message is used to grant the upstream resource to the ONU-X. Specific names of upstream grant messages may be different in different networks. For example, in an IEEE PON system, the upstream grant message is a Gate message. In an ITU PON system, the upstream grant message is an Allocation Structure message. In another network, the upstream grant message may have another name.

The upstream resource mentioned in the embodiments of this application is usually an upstream timeslot, and therefore the upstream resource and the upstream timeslot are used interchangeably sometimes.

The upstream grant message carries an upstream resource grant indication of the ONU-X, and the upstream resource grant indication is used to indicate the upstream resource granted to the ONU-X. In upstream grant messages with different specific names, fields that carry upstream resource grant indications may be different. For example, when the upstream grant message is an Allocation Structure message, the upstream resource grant indication may be carried in a Start Time field and a Grant Size field of the Allocation Structure message. For example, when the upstream grant message is a Gate message, the upstream resource grant indication may be carried in a Timestamp field of the Gate message. The same rule may apply to other network scenarios.

A check field of the jointly checked-encoded upstream grant message is specifically obtained by performing joint check encoding by using a joint check parameter and a payload field of the upstream grant message. The joint check parameter includes a physical identity of the ONU. FIG. 2-B illustrates a possible implementation of performing joint check encoding to obtain a check field of an upstream grant message.

The physical identity of the ONU mentioned in the embodiments of this application is any identity that can be used to uniquely identify the ONU. For example, the physical identity of the ONU may include one or more of the following identities of the ONU: a MAC address, a device SN, or a key.

In this embodiment of this application, the OLT may cache a physical identity of each ONU in advance. Specifically, for example, the OLT may cache the physical identity of each ONU in a physical identity table or another data structure. An example of a physical identity table is shown in FIG. 1-F. The OLT may read a physical identity of a corresponding ONU from the physical identity table based on a requirement, and perform transformation processing on the generated upstream grant message by using the read physical identity of the ONU.

202. The OLT sends the jointly checked-encoded upstream grant message.

203. The ONU-X receives the jointly checked-encoded upstream grant message.

The joint check parameter used for the joint check encoding includes the physical identity of the ONU-X. The ONU-X performs integrity check on the jointly checked-encoded upstream grant message by using the joint check parameter including the physical identity of the ONU, and the payload field and the check field of the jointly checked-encoded upstream grant message.

The joint check parameter may include only the physical identity of the ONU-X, or may include not only the physical identity of the ONU-X but also one or more other transformation parameters. The one or more other transformation parameters mentioned herein are not limited in this application.

204. When the integrity check succeeds (indicating that message belonging check succeeds), the ONU-X extracts the upstream resource grant indication carried in the upstream grant message, and the ONU-X sends an upstream optical signal on the upstream resource that is granted to the ONU-X and that is indicated by using the upstream resource grant indication.

It may be understood that, if another ONU different from the ONU-X (which may be referred to as an ONU-Y for ease of description) also receives the jointly checked-encoded upstream grant message. The ONU-Y also performs integrity check on the jointly checked-encoded upstream grant message by using the joint check parameter (including a physical identity of the ONU-Y). Because the joint check parameter for the jointly checked-encoded upstream grant message does not include the physical identity of the ONU-Y, the ONU-Y fails to perform integrity check on the upstream grant message by using the physical identity of the ONU-Y. The failure indicates that the upstream resource granted by using the upstream grant message is not allocated to the ONU-Y (indicating that message belonging check fails). In this case, the ONU-Y may discard the upstream grant message. This is the same for other ONUs.

It can be learned that in the foregoing example solution, the OLT sends the jointly checked-encoded upstream grant message, and the joint check parameter used for the joint check encoding includes a physical identity of a target ONU (namely, the ONU-X, where the target ONU is an ONU that the OLT expects to respond to the upstream grant message, that is, a home ONU of the upstream grant message). In this way, the upstream grant message sent by the OLT implicitly carries the physical identity of the target ONU, that is, interleaving between the upstream grant message and the physical identity of the target ONU is implemented to some extent. The ONU receiving the upstream grant message needs to perform integrity check on the message by using the same physical identity, so that the integrity check can succeed (successful integrity check indicates that message belonging check succeeds). The physical identity of the ONU is globally unique, and different ONUs have different physical identities. In addition, the physical identity of the ONU is usually related to a hardware entity of the ONU, and remains unchanged when the ONU is powered off or offline. Therefore, each ONU may successfully perform integrity check on an upstream grant message that belongs to the ONU, but cannot successfully perform integrity check on an upstream grant message that does not belong to the ONU. This is conducive to isolation of upstream grant messages between different ONUs. In this case, even if an ONU does not release, in time, an Allocation ID that currently does not belong to the ONU, the ONU is not to respond to an upstream grant message that does not belong to the ONU. In other words, the ONU is not to use an upstream resource granted by using the upstream grant message that does not belong to the ONU (because when the ONU receives the upstream grant message that does not belong to the ONU, the ONU cannot successfully perform, by using a physical identity of the ONU, integrity check on the upstream grant message that does not belong to the ONU). It can be learned that the foregoing solution helps reduce an occurrence probability of a rogue ONU phenomenon, and further improve service stability of a PON system.

The following uses examples to provide further descriptions with reference to different application scenarios such as an ITU PON system and an IEEE PON system.

FIG. 3-A is an example schematic flowchart of another upstream resource grant method according to an embodiment of this application. The solution of this embodiment is applied to an ITU PON system. This embodiment uses an example in which transformation processing is specifically scrambling processing and a transformation parameter used for the transformation processing is specifically a physical identity of an ONU (for example, a device serial number of the ONU). Cases in which other transformation processing manners and other transformation parameters are used may be deduced by analogy.

In an example shown in FIG. 3-A, the another upstream resource grant method may include the following steps.

301. When an OLT needs to grant an upstream resource to an ONU (which is denoted, for example, as an ONU-X for ease of description), the OLT may generate an Allocation Structure message.

The Allocation Structure message may be generated, for example, by a MAC chip in the OLT. The Allocation Structure message carries an upstream resource grant indication, and the upstream resource grant indication is used to indicate the upstream resource granted to the ONU-X. The upstream resource grant indication may be generated through calculation by a dynamic bandwidth assignment (DBA) calculation unit in the MAC chip according to a preset upstream resource allocation rule.

The upstream resource mentioned in this embodiment of this application is, for example, an upstream timeslot.

FIG. 3-B shows an example specific standard format of an Allocation Structure message in an ITU PON system according to this application. In the Allocation Structure message in the example format shown in FIG. 3-B, the first 51 bits are a payload field of the message, and the last 13 bits are a check field of the message. The check field is generated by performing check encoding on the payload field, and the check field carries, for example, a Hybrid Error Correction (HEC) code. The check field may be used by a receive end to perform integrity check on the payload field of the Allocation Structure message. When it is found that a 1-bit error code or a 2-bit error code occurs in the payload field, error correction may be performed by using the check field. This can improve an error tolerance characteristic of the Allocation Structure message for a transmission error code. FIG. 3-C shows an example of performing check encoding on the payload field of the Allocation Structure message to obtain the payload field of the Allocation Structure message.

302. The OLT performs scrambling processing on the generated Allocation Structure message by using a physical identity of the ONU-X, to obtain a scrambling-processed Allocation Structure message.

For example, specifically, scrambling processing may be performed on some or all payload fields of the Allocation Structure message by using the physical identity of the ONU-X, or scrambling processing may be performed on the check field of the Allocation Structure message by using the physical identity of the ONU-X, or scrambling processing may be performed on the check field and at least some payload fields of the Allocation Structure message by using the physical identity of the ONU-X.

FIG. 3-D shows an example of performing scrambling processing on the check field and all payload fields of the Allocation Structure message by using the physical identity of the ONU-X. FIG. 3-E shows an example of performing scrambling processing on the check field and some payload fields of the Allocation Structure message by using the physical identity of the ONU-X. FIG. 3-F shows an example of performing scrambling processing on all payload fields of the Allocation Structure message by using the physical identity of the ONU-X. FIG. 3-G shows an example of performing scrambling processing on some payload fields of the Allocation Structure message by using the physical identity of the ONU-X. FIG. 3-H shows an example of performing scrambling processing on the check field of the Allocation Structure message by using the physical identity of the ONU-X.

FIG. 3-I shows an example in which the physical identity of the ONU is specifically a device SN of the ONU. In the ITU PON system, a length of the device SN of the ONU is 64 bytes, and a length of the Allocation Structure message is also 64 bytes. In this case, the scrambling processing may be specifically performing bitwise multiplication or bitwise exclusive-OR processing between the Allocation Structure message and the device SN of the ONU-X, to obtain a scrambling-processed Allocation Structure message. FIG. 3-J shows an example of a descrambling manner corresponding to the scrambling manner shown in FIG. 3-I.

In addition, in some possible implementations, some broadcast Allocation Structure messages may exist in the ITU PON system, that is, some Allocation Structure messages are sent to all ONUs. In this case, the OLT may scramble the broadcast Allocation Structure messages by using an agreed serial number (that is, a serial number known to all the ONUs) rather than by using a physical identity of an ONU. A specific scrambling manner in this case may be similar to the manners in the examples shown in FIG. 3-D and FIG. 3-E. FIG. 3-K shows an example of a possible manner of performing scrambling processing on the broadcast Allocation Structure messages by using the agreed serial number.

For example, the OLT and the ONU may agree on the scrambling manner (such as a scrambling location and a scrambling algorithm) in a default manner or an interactive manner. In this way, the ONU can descramble the Allocation Structure message in a descrambling manner corresponding to the scrambling manner.

303. The OLT sends the scrambling-processed Allocation Structure message.

304. After receiving the scrambling-processed Allocation Structure message sent by the OLT, an ONU-A performs descrambling processing on the Allocation Structure message by using a physical identity of the ONU-A.

If the descrambling succeeds, step 306 is performed.

If the descrambling fails, step 305 is performed.

305. The ONU-A may discard the Allocation Structure message.

306. If successfully descrambling the Allocation Structure message (that is, the ONU-A successfully performs descrambling to obtain a descrambling-processed Allocation Structure message), the ONU-A performs integrity check on the descrambling-processed Allocation Structure message by using the check field (Hybrid Error Correction (HEC) code) of the descrambling-processed Allocation Structure message. If the integrity check on the descrambling-processed Allocation Structure message succeeds, the ONU-A reads an Allocation Identifier (for example, an Allocation-ID) and the upstream resource grant indication from the descrambling-processed Allocation Structure message. If the integrity check on the descrambling-processed Allocation Structure message fails, the ONU-A may discard the Allocation Structure message.

The ONU-A matches the read Allocation-ID with an Allocation-ID cached by the ONU-A (when the ONU-A caches a plurality of Allocation-IDs, if the read Allocation-ID matches any one of the cached Allocation-IDs, it indicates that the read Allocation-ID successfully matches the Allocation-IDs cached by the ONU-A). When the read Allocation-ID successfully matches the Allocation-ID cached by the ONU-A, the ONU-A sends an upstream optical signal in the granted upstream grant timeslot indicated by using the upstream resource grant indication. When the read Allocation-ID fails to match the Allocation-ID cached by the ONU-A, the ONU-A may discard the Allocation Structure message.

In some possible implementations, the Allocation-ID cached by the optical network unit may be delivered, for example, by the OLT in advance by using another management message. For example, the OLT may deliver an Allocation-ID owned by each ONU to the ONU based on a service requirement by using a management message. Each ONU may cache the Allocation-ID delivered by the OLT. One ONU may have one or more Allocation-IDs.

Successful Allocation-ID matching may be considered as a success of message recheck, that is, an Allocation-ID matching mechanism may be considered as a message belonging rechecking mechanism. The rechecking mechanism helps further improve message belonging accuracy, and helps further reduce an occurrence probability of a rogue ONU phenomenon. Certainly, for some scenarios in which message belonging double-check is not required, the foregoing Allocation-ID matching process may be omitted.

In addition, when there may be some broadcast Allocation Structure messages (that is, the broadcast Allocation Structure messages may have been scrambled by using the agreed serial number), the Allocation Structure messages received by the ONU-A may have been scrambled by using the physical identity of the ONU-A, or may have been scrambled by using the agreed serial number.

In some possible implementations, after the ONU-A receives the Allocation Structure message, before performing descrambling processing on the Allocation Structure message by using the physical identity of the ONU-A, the ONU-A may first perform descrambling processing on the Allocation Structure message by using the agreed serial number. If the descrambling fails, the ONU-A still performs step 304. If the descrambling succeeds, the ONU-A may not perform step 304 (that is, step 304 may be omitted), and the ONU-A may perform integrity check on the descrambling-processed Allocation Structure message directly by using the check field (the HEC code) of the Allocation Structure message that is obtained through successful descrambling by using the agreed serial number. If the integrity check on the descrambling-processed Allocation Structure message succeeds, the ONU-A may read the upstream resource grant indication from the descrambling-processed Allocation Structure message, and may send the upstream optical signal in the granted upstream grant timeslot indicated by using the upstream resource grant indication.

In some other possible implementations, when the ONU-A receives the Allocation Structure message, after the descrambling performed on the Allocation Structure message by using the physical identity of the ONU-A fails, the ONU-A may perform descrambling processing on the Allocation Structure message by using the agreed serial number. If the descrambling still fails, the ONU-A may discard the Allocation Structure message. If the descrambling performed on the Allocation Structure message by using the agreed serial number succeeds, the ONU-A may perform integrity check on the descrambling-processed Allocation Structure message directly by using the check field of the Allocation Structure message that is obtained through successful descrambling by using the agreed serial number. If the integrity check on the descrambling-processed Allocation Structure message succeeds, the ONU-A may read the upstream resource grant indication from the descrambling-processed Allocation Structure message, and may send the upstream optical signal in the granted upstream grant timeslot indicated by using the upstream resource grant indication.

Moreover, because the broadcast Allocation Structure message is to be sent by the OLT to each ONU, the OLT may alternatively not perform any scrambling on the broadcast Allocation Structure message, that is, the OLT may send the unscrambled Allocation Structure message. In this case, the ONU does not need to perform a related descrambling operation on the broadcast Allocation Structure message.

It can be learned that in the foregoing solution, the OLT sends the scrambling-processed Allocation Structure message, and a scrambling parameter used for the scrambling processing includes a physical identity of a target ONU (namely, the ONU-X). In this way, the Allocation Structure message sent by the OLT implicitly carries the physical identity of the target ONU, that is, interleaving between the Allocation Structure message and the physical identity of the target ONU is implemented to some extent. The ONU receiving the Allocation Structure message needs to perform descrambling processing by using the same physical identity, so that the unscrambled Allocation Structure message can be successfully restored through descrambling processing. The physical identity of the ONU is globally unique, and different ONUs have different physical identities. In addition, the physical identity of the ONU is usually related to a hardware entity of the ONU, and remains unchanged when the ONU is powered off or offline. Therefore, each ONU can successfully restore, through corresponding descrambling processing, an Allocation Structure message sent to the ONU, but cannot successfully restore, through corresponding descrambling processing, an Allocation Structure message that is not sent to the ONU. This is conducive to isolation of Allocation Structure messages between different ONUs. In this case, even if an ONU does not release, in time, an Allocation ID that currently does not belong to the ONU, the ONU is not to respond to an Allocation Structure message that does not belong to the ONU. In other words, the ONU is not to use an upstream resource granted by using the Allocation Structure message that does not belong to the ONU. It can be learned that the foregoing solution helps reduce an occurrence probability of a rogue ONU phenomenon in the ITU PON system, and further improve service stability of the ITU PON system.

FIG. 4-A is an example schematic flowchart of another upstream resource grant method according to an embodiment of this application. The solution of this embodiment is applied to an ITU PON system. This embodiment uses an example in which transformation processing is specifically check encoding processing and a transformation parameter used for the transformation processing is specifically a physical identity of an ONU (for example, a device SN of the ONU). Cases in which other transformation parameters are used may be deduced by analogy.

401. When an OLT needs to grant an upstream resource to an ONU (which is denoted, for example, as an ONU-X for ease of description), the OLT may generate an Allocation Structure message.

The Allocation Structure message may be generated, for example, by a MAC chip in the OLT. The Allocation Structure message carries an upstream resource grant indication, and the upstream resource grant indication is used to indicate the upstream resource granted to the ONU-X. The upstream resource grant indication may be generated through calculation by a dynamic bandwidth assignment (DBA) calculation unit in the MAC chip according to a preset resource allocation rule.

A check field (an HEC code) of the Allocation Structure message is generated by performing joint check encoding by using a physical identity of the ONU-X and a payload field of the Allocation Structure message.

FIG. 4-B shows an example of performing joint check encoding by using the physical identity of the ONU-X and the payload field of the Allocation Structure message, to generate the check field (HEC code) of the Allocation Structure message.

In addition, in some possible implementations, some broadcast Allocation Structure messages may exist in the ITU PON system, that is, some Allocation Structure messages are sent to all ONUs. In this case, the OLT may perform joint check encoding by using an agreed serial number (that is, a serial number known to all the ONUs) and payload fields of the broadcast Allocation Structure messages rather than by using an SN of an ONU and the payload fields of the broadcast Allocation Structure messages, to obtain check fields of the broadcast Allocation Structure messages. FIG. 4-C shows an example of performing joint check encoding by using the agreed serial number and the payload fields of the broadcast Allocation Structure messages, to obtain the check fields of the broadcast Allocation Structure messages.

402. The OLT sends a jointly checked-encoded Allocation Structure message.

403. After receiving the jointly checked-encoded Allocation Structure message, an ONU-A performs integrity check on the Allocation Structure message by using a physical identity of the ONU-A, and the check field (the HEC code) and the payload field of the Allocation Structure message.

If the integrity check fails, step 404 is performed.

If the integrity check succeeds, step 405 is performed.

404. The ONU-A may discard the Allocation Structure message.

405. If the integrity check succeeds, the ONU-A reads the upstream resource grant indication and an Allocation Identifier (for example, an Allocation-ID) from the Allocation Structure message.

The ONU-A matches the read Allocation-ID with an Allocation-ID cached by the ONU-A (when the ONU-A caches a plurality of Allocation-IDs, if the read Allocation-ID matches any one of the cached Allocation-IDs, it indicates that the read Allocation-ID successfully matches the Allocation-IDs cached by the ONU-A). When the read Allocation-ID successfully matches the Allocation-ID cached by the ONU-A, the ONU-A sends an upstream optical signal in the granted upstream grant timeslot indicated by using the upstream resource grant indication. When the read Allocation-ID fails to match the Allocation-ID cached by the ONU-A, the ONU-A may discard the Allocation Structure message.

In some possible implementations, the Allocation-ID cached by the optical network unit may be delivered, for example, by the OLT in advance by using another management message. For example, the OLT may deliver an Allocation-ID owned by each ONU to the ONU based on a service requirement by using a management message. Each ONU may cache the Allocation-ID delivered by the OLT. One ONU may have one or more Allocation-IDs.

Successful Allocation-ID matching may be considered as a success of message recheck, that is, an Allocation-ID matching mechanism may be considered as a message belonging rechecking mechanism. The rechecking mechanism helps further improve message belonging accuracy, and helps further reduce an occurrence probability of a rogue ONU phenomenon. Certainly, for some scenarios in which message belonging double-check is not required, the foregoing Allocation-ID matching process may be omitted.

In addition, when there may be some broadcast Allocation Structure messages (that is, joint check encoding may be performed by using the agreed serial number and payload fields of the broadcast Allocation Structure messages, to generate check fields of the Allocation Structure messages), the check fields of the Allocation Structure messages received by the ONU-A may be obtained through joint check encoding by using the physical identity of the ONU-A and the payload fields of the Allocation Structure messages, or may be obtained through joint check encoding by using the agreed serial number and the payload fields of the Allocation Structure messages.

In some possible implementations, after the ONU-A receives the Allocation Structure message, before performing integrity check on the Allocation Structure message by using the physical identity of the ONU-A, and the check field and the payload field of the Allocation Structure message, the ONU-A may first perform integrity check on the Allocation Structure message by using the check field and the payload field of the Allocation Structure message and the agreed serial number. If the integrity check fails, the ONU-A still performs step 403. If the integrity check succeeds, the ONU-A may not perform step 403 (that is, step 403 is omitted), and in this case, the ONU-A may read the upstream resource grant indication from the Allocation Structure message, and may send the upstream optical signal in the granted upstream grant timeslot indicated by using the upstream resource grant indication.

In some other possible implementations, when the ONU-A receives the Allocation Structure message, after the integrity check on the Allocation Structure message by using the physical identity of the ONU-A, and the check field and the payload field of the Allocation Structure message fails, the ONU-A may further perform integrity check on the Allocation Structure message by using the agreed serial number, and the check field and the payload field of the Allocation Structure message. If the integrity check still fails, the ONU-A may discard the Allocation Structure message. If the integrity check succeeds, the ONU-A may read the upstream resource grant indication from the Allocation Structure message, and may send the upstream optical signal in the granted upstream grant timeslot indicated by using the upstream resource grant indication.

Moreover, because the broadcast Allocation Structure message is to be sent by the OLT to each ONU, the OLT may alternatively not perform joint check encoding on the broadcast Allocation Structure message, that is, the OLT may send the Allocation Structure message on which the joint check encoding has not been performed. In this case, when performing integrity check on the broadcast Allocation Structure message, the ONU does not need to reference the agreed serial number.

It can be learned that in the foregoing solution, the OLT sends the jointly checked-encoded Allocation Structure message, and a parameter used for the joint check encoding includes a physical identity of a target ONU (namely, the ONU-X). In this way, the Allocation Structure message sent by the OLT implicitly carries the physical identity of the target ONU, that is, interleaving between the Allocation Structure message and the physical identity of the target ONU is implemented to some extent. The ONU receiving the Allocation Structure message needs to perform joint check decoding processing by using the same physical identity, so that integrity check on the Allocation Structure message can succeed. The physical identity of the ONU is globally unique, and different ONUs have different physical identities. In addition, the physical identity of the ONU may be related to a hardware entity of the ONU, and remains unchanged when the ONU is powered off or offline. Therefore, each ONU can successfully perform, through corresponding joint check decoding processing, integrity check on an Allocation Structure message sent to the ONU, but cannot successfully perform, through corresponding joint check decoding processing, integrity check on an Allocation Structure message that is not sent to the ONU. This is conducive to isolation, between different ONUs, of Allocation Structure messages that belong to respective ONUs. In this case, even if an ONU does not release, in time, an Allocation ID that currently does not belong to the ONU, the ONU is not to respond to an Allocation Structure message that does not belong to the ONU. In other words, the ONU is not to use an upstream resource granted by using the Allocation Structure message that does not belong to the ONU (because when the ONU receives the Allocation Structure message that does not belong to the ONU, the ONU cannot successfully perform, by using a physical identity of the ONU, integrity check on the Allocation Structure message that does not belong to the ONU, that is, the Allocation Structure message cannot succeed in message belonging check). It can be learned that the foregoing example solution helps reduce an occurrence probability of a rogue ONU phenomenon in the ITU PON system, and further improve service stability of the ITU PON system.

FIG. 5-A is an example schematic flowchart of another upstream grant method according to an embodiment of this application. The method in this embodiment is mainly applied to an IEEE PON system (such as EPON, 10G-EPON, or 25G-EPON). The another upstream grant method may include the following steps.

501. When an OLT needs to grant an upstream resource to an ONU (which is denoted, for example, as an ONU-X for ease of description), the OLT may generate a Gate message.

The Gate message may be specifically generated by a MAC chip or another chip in the OLT. The Gate message carries an upstream resource grant indication, and the upstream resource grant indication is used to indicate the upstream resource granted to the ONU-X. The upstream resource grant indication may be generated through calculation by a dynamic bandwidth assignment (DBA) calculation unit in the MAC chip according to a preset rule.

In the IEEE PON system, an upstream timeslot grant may be completed by using the Gate message. The Gate message belongs to a multi-point control protocol (MPCP, multi-point control protocol) message type. The MPCP message type includes the Gate message and other point-to-multi-point management messages. The solution of this embodiment may also be extended to be applied to various MPCP message types used in the existing IEEE PON system. The following mainly uses the Gate message as an example for description.

FIG. 5-B shows an example of a format of a Gate message. The Gate message is a fixed-length Ethernet packet and may be indicated by 0x8808 of a Length/Type field, and a length of the Gate message is a fixed length of 64 bytes. 40 bytes thereof indicate a message content field and a padding field (a Data/Reserved/Pad field in FIG. 5-B). The last 4 bytes indicate a check field, and the check field carries, for example, a frame check sequence (FCS, frame check sequence). The check field may be used to check integrity of the Ethernet packet. FIG. 5-C shows an example of performing check encoding on a payload field of the Gate message to obtain the payload field of the Gate message. A Timestamp field of the Gate message may be used to carry an upstream resource grant indication.

502. The OLT performs scrambling processing on the Gate message by using a physical identity of the ONU-X, to obtain a scrambling-processed Gate message.

For example, specifically, scrambling processing may be performed on some or all payload fields of the Gate message by using the physical identity of the ONU-X, or scrambling processing may be performed on the check field of the Gate message by using the physical identity of the ONU-X, or scrambling processing may be performed on the check field and at least some payload fields of the Gate message by using the physical identity of the ONU-X.

Similar effects can also be achieved in the IEEE PON system by using a scrambling method similar to that in the embodiment corresponding to FIG. 3-A. For a specific scrambling manner, refer to FIG. 5-D to FIG. 5-G.

FIG. 5-D shows an example of performing scrambling processing on some payload fields (for example, including a Timestamp field) of the Gate message by using the physical identity of the ONU. FIG. 5-E shows an example of performing scrambling processing on all payload fields of the Gate message by using the physical identity of the ONU. FIG. 5-F shows an example of performing scrambling processing on the check field (for example, an FCS) of the Gate message by using the physical identity of the ONU. FIG. 5-G shows an example of performing scrambling processing on the check field and some payload fields of the Gate message by using the physical identity of the ONU.

In some possible implementations, some broadcast Gate messages exist in the PON system, that is, some Gate messages are sent to all ONUs. In this case, the OLT may scramble the broadcast Gate messages by using an agreed serial number (that is, a serial number known to all the ONUs) rather than by using a physical identity of an ONU. A specific scrambling manner in this case is similar to the manners in the examples shown in FIG. 5-D to FIG. 5-G. FIG. 5-H shows an example of a possible manner of performing scrambling on the broadcast Gate messages by using the agreed serial number.

For example, the OLT and the ONU may agree on the scrambling manner (such as a scrambling location and a scrambling algorithm) in a default manner or an interactive manner. In this way, the ONU can descramble the Gate message in a descrambling manner corresponding to the scrambling manner.

503. The OLT sends the scrambling-processed Gate message.

504. An ONU-A receives the scrambling-processed Gate message sent by the OLT, reads a logical link identifier (LLID) carried in a preamble of the Gate message, and matches the LLID carried in the preamble of the Gate message with an LLID cached by the ONU-A.

If the matching succeeds, step 505 is performed.
If the matching fails, step 506 is performed.

505. The ONU-A performs descrambling processing on the Gate message by using a physical identity of the ONU-A.

If the descrambling succeeds, step 507 is performed.
If the descrambling fails, step 506 is performed.

506. The ONU-A may discard the Gate message.

507. If successfully descrambling the Gate message, the ONU-A may perform integrity check on a descrambling-processed Gate message by using the check field (for example, the FCS) of the descrambling-processed Gate message. If the integrity check on the descrambling-processed Gate message succeeds, the ONU-A reads the upstream resource grant indication from the descrambling-processed Gate message, and sends an upstream optical signal in the upstream grant timeslot indicated by using the read upstream resource grant indication.

It may be understood that the foregoing description uses an example in which LLID matching is first performed and then integrity check is performed. During actual product implementation, integrity check may be first performed and then LLID matching may be performed. Details are not described herein.

In some possible implementations, the LLID cached by the optical network unit may be delivered, for example, by the OLT in advance by using another management message.

For example, the OLT may deliver an LLID owned by each ONU to the ONU based on a service requirement by using a management message. Each ONU may cache the LLID delivered by the OLT. One ONU may have one or more LLIDs.

Successful LLID matching may be considered as a success of message recheck, that is, an LLID matching mechanism may be considered as a message belonging rechecking mechanism. The rechecking mechanism helps further improve message belonging accuracy, and helps further reduce an occurrence probability of a rogue ONU phenomenon. Certainly, for some scenarios in which message belonging double-check is not required, the foregoing LLID matching process may be omitted.

In addition, when there may be some broadcast Gate messages (that is, the broadcast Gate messages may have been scrambled by using the agreed serial number), the Gate messages received by the ONU-A may have been scrambled by using the physical identity of the ONU-A, or may have been scrambled by using the agreed serial number.

In some possible implementations, after the ONU-A receives the Gate message, before performing descrambling processing on the Gate message by using the physical identity of the ONU-A (before step 505 is performed), the ONU-A may first perform descrambling processing on the Gate message by using the agreed serial number. If the descrambling fails, the ONU-A still performs step 505. If the descrambling succeeds, the ONU-A may not perform step 505 (step 505 may be omitted), and the ONU-A may perform integrity check on the descrambling-processed Gate message directly by using the check field (an HEC code) of the Gate message that is obtained through successful descrambling by using the agreed serial number. If the integrity check on the descrambling-processed Gate message succeeds, the ONU-A may read the upstream resource grant indication from the descrambling-processed Gate message, and may send the upstream optical signal in the granted upstream grant timeslot indicated by using the upstream resource grant indication.

In some other possible implementations, when the ONU-A receives the Gate message, after the descrambling processing performed on the Gate message by using the physical identity of the ONU-A fails, the ONU-A performs descrambling processing on the Gate message by using the agreed serial number. If the descrambling still fails, the ONU-A may discard the Gate message. If the descrambling succeeds, the ONU-A may perform integrity check on the descrambling-processed Gate message directly by using the check field (an HEC code) of the Gate message that is obtained through successful descrambling by using the agreed serial number. If the integrity check on the descrambling-processed Gate message succeeds, the ONU-A may read the upstream resource grant indication from the descrambling-processed Gate message, and may send the upstream optical signal in the granted upstream grant timeslot indicated by using the upstream resource grant indication.

Moreover, because the broadcast Gate message is to be sent by the OLT to each ONU, the OLT may alternatively not perform any scrambling on the broadcast Gate message, that is, the OLT may send the unscrambled Gate message. In this case, the ONU does not need to perform a related descrambling operation on the broadcast Gate message.

It can be learned that in the foregoing solution, the OLT sends the scrambling-processed Gate message, and a scrambling parameter used for the scrambling processing includes a physical identity of a target ONU (namely, the ONU-X).

In this way, the Gate message sent by the OLT implicitly carries the physical identity of the target ONU, that is, interleaving between the Gate message and the physical identity of the target ONU is implemented to some extent. The ONU receiving the Gate message needs to perform descrambling processing by using the same physical identity, so that the unscrambled Gate message can be successfully restored through descrambling processing. The physical identity of the ONU is globally unique, and different ONUs have different physical identities. In addition, the physical identity of the ONU is usually related to a hardware entity of the ONU, and remains unchanged when the ONU is powered off or offline. Therefore, each ONU can successfully restore, through corresponding descrambling processing, a Gate message sent to the ONU, but cannot successfully restore, through corresponding descrambling processing, a Gate message that is not sent to the ONU. This is conducive to isolation of allocation structure messages between different ONUs. In this case, even if an ONU does not release, in time, an LLID that currently does not belong to the ONU, the ONU is not to respond to a Gate message that does not belong to the ONU. In other words, the ONU is not to use an upstream resource granted by using the Gate message that does not belong to the ONU (because the Gate message cannot succeed in message belonging check). It can be learned that the foregoing solution helps reduce an occurrence probability of a rogue ONU phenomenon in the IEEE PON system, and further improve service stability of the IEEE PON system.

FIG. 6-A is an example schematic flowchart of another upstream grant method according to an embodiment of this application. The method in this embodiment is mainly applied to an IEEE PON system (such as EPON, 10G-EPON, or 25G-EPON). The another upstream grant method may include the following steps.

601. When an OLT needs to grant an upstream resource to an ONU (which is denoted, for example, as an ONU-X for ease of description), the OLT may generate a Gate message.

The Gate message may be specifically generated by a MAC chip in the OLT. Grant content included in the Gate message may be generated through calculation by a dynamic bandwidth assignment (DBA) calculation unit in the MAC chip according to a preset rule.

In the IEEE PON system, an upstream timeslot grant may be completed by using the Gate message that belongs to an MPCP message type. The MPCP message type includes the Gate message and other point-to-multipoint management messages. The solution of this embodiment may also be extended to be applied to all MPCP message types used in the existing IEEE PON system. The following mainly uses the Gate message as an example for description.

A check field (an FCS) of the Gate message is generated by performing joint check encoding by using a physical identity of the ONU-X and a payload field of the Gate message.

FIG. 6-B shows an example of performing joint check encoding by using the physical identity of the ONU-X and the payload field of the Gate message, to generate the check field (the FCS) of the Gate message.

In addition, in some possible implementations, some broadcast Gate messages may exist in an ITU PON system, that is, some Gate messages are sent to all ONUs. In this case, the OLT may perform joint check encoding by using an agreed serial number (that is, a serial number known to all the ONUs) and payload fields of the broadcast Gate messages rather than by using a physical identity of an ONU and the payload fields of the broadcast Gate messages, to obtain check fields of the broadcast Gate messages. FIG. 6-C shows an example of performing joint check encoding by using the agreed serial number and the payload fields of the broadcast Gate messages, to obtain the check fields of the broadcast Gate messages.

602. The OLT sends a jointly checked-encoded Gate message.

603. An ONU-A receives the jointly checked-encoded Gate message sent by the OLT, reads a logical link identifier (LLID) carried in a preamble of the Gate message, and matches the LLID carried in the preamble of the Gate message with an LLID cached by the ONU-A.

If the matching succeeds, step 604 is performed.

If the matching fails, step 605 is performed.

604. The ONU-A performs integrity check on the Gate message by using a physical identity of the ONU-A and the check field (the FCS) of the Gate message.

If the integrity check fails, step 605 is performed.

If the integrity check succeeds, step 606 is performed.

605. The ONU-A may discard the Gate message.

606. If the integrity check on the Gate message succeeds, the ONU-A reads the upstream resource grant indication from the Gate message, and sends an upstream optical signal in the upstream grant timeslot indicated by using the upstream resource grant indication.

It may be understood that the foregoing description uses an example in which LLID matching is first performed and then integrity check is performed. During actual product implementation, integrity check may be first performed and then LLID matching may be performed. Details are not described herein.

In some possible implementations, the LLID cached by the optical network unit may be delivered, for example, by the OLT in advance by using another management message. For example, the OLT may deliver an LLID owned by each ONU to the ONU based on a service requirement by using a management message. Each ONU may cache the LLID delivered by the OLT. One ONU may have one or more LLIDs.

Successful LLID matching may be considered as a success of message recheck, that is, an LLID matching mechanism may be considered as a message belonging rechecking mechanism. The rechecking mechanism helps further improve message belonging accuracy, and helps further reduce an occurrence probability of a rogue ONU phenomenon. Certainly, for some scenarios in which message belonging double-check is not required, the foregoing LLID matching process may be omitted.

In addition, when there may be some broadcast Gate messages (that is, joint check encoding may be performed by using the agreed serial number and payload fields of the broadcast Gate messages, to generate check fields of the Gate messages), the check fields of the Gate messages received by the ONU-A may be obtained through joint check encoding by using the physical identity of the ONU-A and the payload fields of the Gate messages, or may be obtained through joint check encoding by using the agreed serial number and the payload fields of the Gate messages.

In some possible implementations, after the ONU-A receives the Gate message, before performing integrity check on the Gate message by using the physical identity of the ONU-A and the check field of the Gate message, the ONU-A may first perform integrity check on the Gate message by using the agreed serial number and the check field of the Gate message. If the integrity check fails, the ONU-A still performs step 604. If the integrity check succeeds, the ONU-A may not perform step 604 (that is, step 604 may be omitted), and in this case, the ONU-A may read the upstream resource grant indication from the Gate message, and may send the upstream optical signal in the granted upstream grant timeslot indicated by using the upstream resource grant indication.

In some other possible implementations, when the ONU-A receives the Gate message, after the integrity check on the Gate message by using the physical identity of the ONU-A and the check field of the Gate message fails, the ONU-A may further perform integrity check on the Gate message by using the agreed serial number and the check field of the Gate message. If the integrity check still fails, the ONU-A may discard the Gate message. If the integrity check succeeds, the ONU-A may read the upstream resource grant indication from the Gate message, and may send the upstream optical signal in the granted upstream grant timeslot indicated by using the upstream resource grant indication.

Moreover, because the broadcast Gate message is to be sent by the OLT to each ONU, the OLT may alternatively not perform joint check encoding on the broadcast Gate message, that is, the OLT may send the Gate message on which the joint check encoding has not been performed. In this case, when performing integrity check on the broadcast Gate message, the ONU does not need to reference the agreed serial number.

It can be learned that in the foregoing solution, the OLT sends the jointly checked-encoded Gate message, and a parameter used for the joint check encoding includes a physical identity of a target ONU (namely, the ONU-X). In this way, the Gate message sent by the OLT implicitly carries the physical identity of the target ONU, that is, interleaving between the Gate message and the physical identity of the target ONU is implemented to some extent. The ONU receiving the Gate message needs to perform joint check decoding by using the same physical identity, so that integrity check on the Gate message can succeed. The physical identity of the ONU is globally unique, and different ONUs have different physical identities. In addition, the physical identity of the ONU may be related to a hardware entity of the ONU, and remains unchanged when the ONU is powered off or offline. Therefore, each ONU can successfully perform, through corresponding joint check decoding processing, integrity check on a Gate message sent to the ONU, but cannot successfully perform, through corresponding joint check decoding processing, integrity check on a Gate message that is not sent to the ONU. This is conducive to isolation, between different ONUs, of Gate messages that belong to respective ONUs. In this case, even if an ONU does not release, in time, an LLID that currently does not belong to the ONU, the ONU is not to respond to a Gate message that does not belong to the ONU. In other words, the ONU is not to use an upstream resource granted by using the Gate message that does not belong to the ONU (because when the ONU receives the Gate message that does not belong to the ONU, the ONU cannot successfully perform, by using a physical identity of the ONU, integrity check on the Gate message that does not belong to the ONU, that is, the Gate message cannot succeed in message belonging check). It can be learned that the foregoing example solution helps reduce an occurrence probability of a rogue ONU phenomenon in the IEEE PON system, and further improve service stability of the IEEE PON system.

The following further provides some device embodiments by using examples.

Refer to FIG. 7. An embodiment of this application provides an optical line terminal 700. The optical line terminal 700 includes a generation unit 710 and a communications unit 720.

The generation unit 710 is configured to generate an upstream grant message on which transformation processing has been performed, where a transformation parameter used for the transformation processing includes a physical identity of an optical network unit.

Inverse transformation processing is performed, by using the transformation parameter, on the upstream grant message on which the transformation processing has been performed, so that the upstream grant message on which the transformation processing has not been performed can be restored.

The communications unit 720 is configured to send the upstream grant message on which the transformation processing has been performed, where the upstream grant message carries an upstream resource grant indication of the optical network unit, and the upstream resource grant indication is used to indicate an upstream resource granted to the optical network unit.

For example, transformation processing is performed on at least some payload fields of the upstream grant message by using the transformation parameter, or transformation processing is performed on a check field of the upstream grant message by using the transformation parameter, or transformation processing is performed on a check field and at least some payload fields of the upstream grant message by using the transformation parameter.

For example, the transformation processing includes scrambling processing and/or encryption processing. Inverse transformation processing corresponding to the scrambling processing is descrambling processing, and inverse transformation processing corresponding to the encryption processing is decryption processing.

For example, the physical identity of the optical network unit includes one or more of the following identities of the optical network unit: a device serial number, a media access control address (MAC address), or a key.

For example, the upstream grant message is a Gate message or an Allocation Structure message.

For specific implementation details of functions of related modules in the optical line terminal 700, refer to related descriptions of the optical line terminal in the example solution in FIG. 1-E, FIG. 3-A, or FIG. 5-A. Details are not described herein again.

Figure 8:
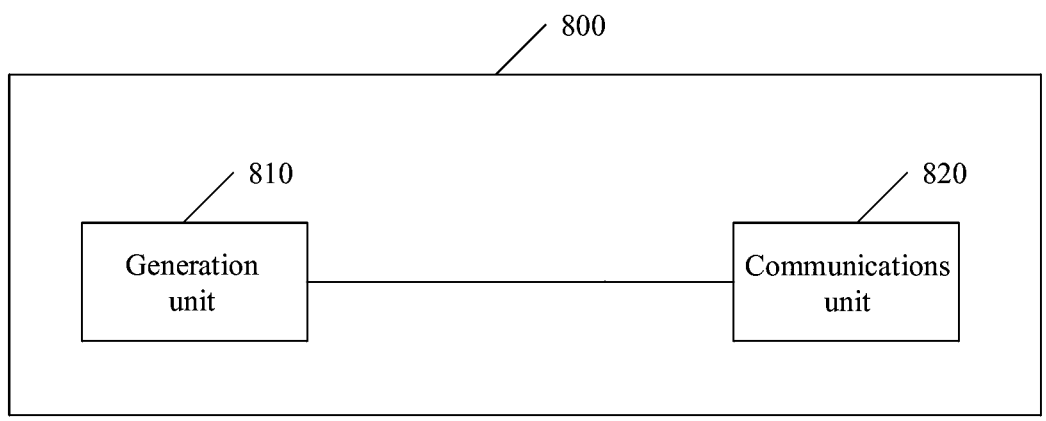
FIG. 8 is an example schematic diagram of a structure of another optical line terminal according to an embodiment of this application.

Refer to FIG. 8. An embodiment of this application provides an optical line terminal 800. The optical line terminal 800 includes a generation unit 810 and a communications unit 820.

The generation unit 810 is configured to generate a jointly checked-encoded upstream grant message, where a check field of the jointly checked-encoded upstream grant message is obtained by performing joint check encoding by using a joint check parameter and a pay load field of the upstream grant message, and the joint check parameter includes a physical identity of an optical network unit.

The communications unit 820 is configured to send the jointly checked-encoded upstream grant message, where the jointly checked-encoded upstream grant message carries an upstream resource grant indication of the optical network unit, and the upstream resource grant indication is used to indicate an upstream resource granted to the optical network unit.

For example, the physical identity of the optical network unit includes one or more of the following identities of the optical network unit: a device serial number, a media access control address (MAC address), or a key. For example, the upstream grant message is a Gate message or an Allocation Structure message.

For specific implementation details of functions of related modules in the optical line terminal 800, refer to related descriptions of the optical line terminal in the example solution in FIG. 2-A, FIG. 4-A, or FIG. 6-A. Details are not described herein again.

Figure 9:
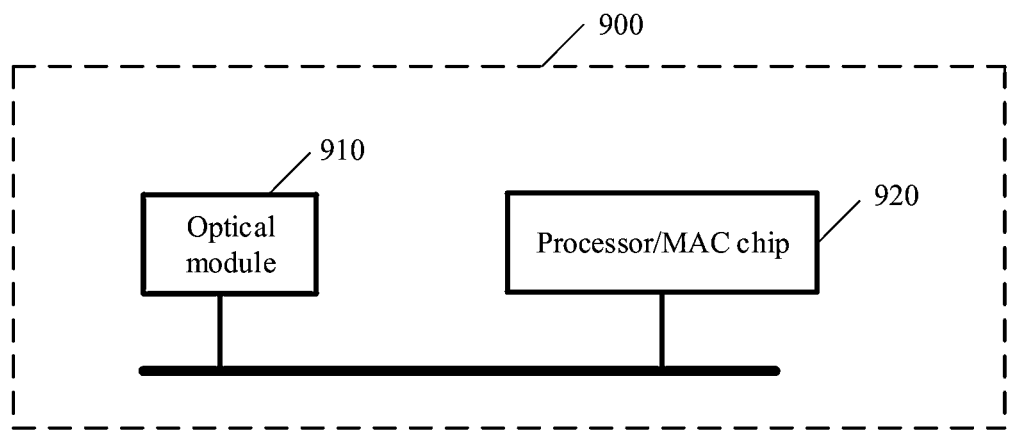
FIG. 9 is an example schematic diagram of a structure of another optical line terminal according to an embodiment of this application.

Refer to FIG. 9. An embodiment of this application provides an optical line terminal 900. The optical line terminal 900 may include an optical module 910 and a processor and/or MAC chip 920 coupled to the optical module 910. The processor and/or MAC chip 920 are/is configured to perform some or all steps of any method that is performed by the optical line terminal and that is provided in the embodiments of this application.

Alternatively, the processor may invoke a computer program stored in a memory, to complete some or all steps of any method that is performed by the optical line terminal and that is in the embodiments of this application.

The processor is also referred to as a central processing unit (CPU). In specific application, components of the optical line terminal 900 are coupled to each other, for example, through a bus system. In addition to a data bus, the bus system may further include a power bus, a control bus, a status signal bus, and the like. The processor may be an integrated circuit chip and has a signal processing capability. In some implementation processes, some or all steps in the foregoing methods can be implemented by using an integrated logical circuit of hardware in the processor, or by using instructions in a form of software. The processor may be a general-purpose processor, a digital signal processor, an application-specific integrated circuit, a field programmable gate array or another programmable logic device, a discrete gate or a transistor logic device, or a discrete hardware component. The processor may implement or perform methods, steps, and logical block diagrams disclosed in the embodiments of this application. The general-purpose processor may be a microprocessor, or the processor may be any conventional processor, or the like. Steps of the methods disclosed in the embodiments of this application may be directly performed and completed by a hardware decoding processor, or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory. For example, the processor may read information from the memory, and complete some or all steps in the foregoing methods in combination with hardware of the processor.

Figure 10:
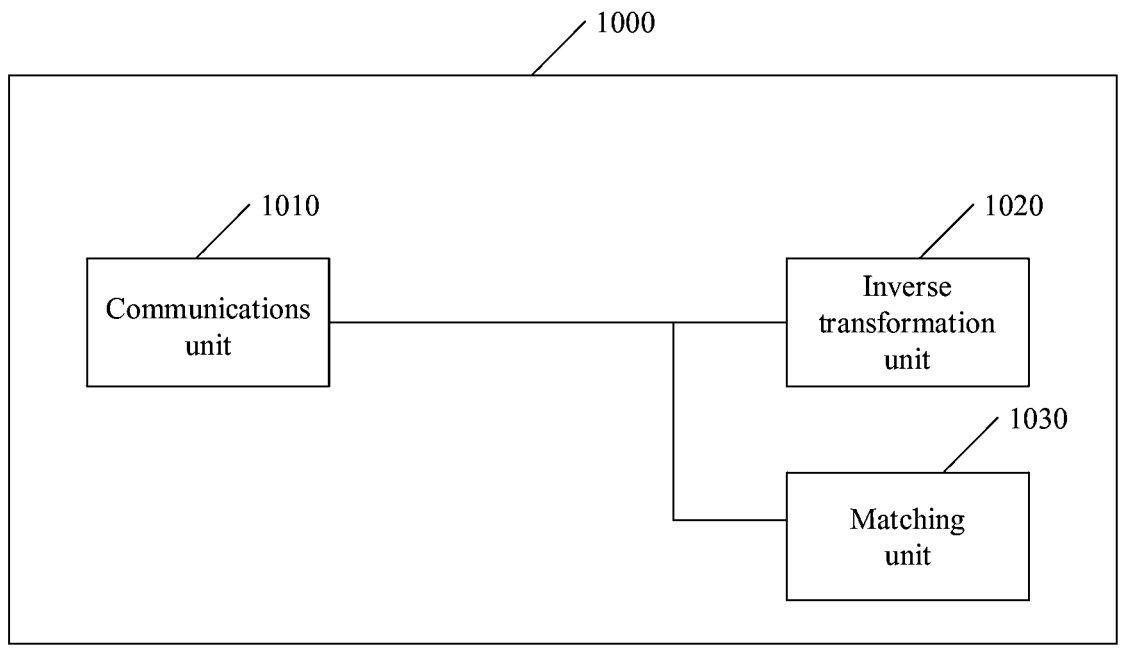
FIG. 10 is an example schematic diagram of a structure of an optical network unit according to an embodiment of this application.

Refer to FIG. 10. An embodiment of this application provides an optical network unit 1000. The optical network unit 1000 includes a communications unit 1010 and an inverse transformation unit 1020.

The communications unit 1010 is configured to receive an upstream grant message on which transformation processing has been performed, where a transformation parameter used for the transformation processing includes a physical identity of the optical network unit.

The inverse transformation unit 1020 is configured to perform, by using the transformation parameter, inverse transformation processing on the upstream grant message on which the transformation processing has been performed.

The communications unit 1010 is further configured to: when the inverse transformation processing succeeds, extract an upstream resource grant indication carried in an upstream grant message on which the inverse transformation processing has been performed, and send an upstream optical signal on an upstream resource that is granted to the optical network unit and that is indicated by using the upstream resource grant indication.

For example, transformation processing is performed on at least some payload fields of the upstream grant message by using the transformation parameter, or transformation processing is performed on a check field of the upstream grant message by using the transformation parameter, or transformation processing is performed on a check field and at least some payload fields of the upstream grant message by using the transformation parameter.

For example, the transformation processing includes scrambling processing and/or encryption processing.

For example, the physical identity of the optical network unit includes one or more of the following identities of the optical network unit: a device serial number, a media access control address, or a key.

For example, the upstream grant message is a Gate message, an Allocation Structure message, or another upstream grant message.

For example, the optical network unit 1000 further includes a matching unit 1030.

When the upstream grant message is a Gate message, the matching unit 1030 is configured to: before the communications unit sends the upstream optical signal on the upstream resource that is granted to the optical network unit and that is indicated by using the upstream resource grant indication, determine that a logical link identifier (LLID) cached by the optical network unit successfully matches an LLID carried in a preamble of the Gate message.

For another example, when the upstream grant message is an Allocation Structure message, the matching unit 1030 is configured to: before the communications unit sends the upstream optical signal on the upstream resource that is granted to the optical network unit and that is indicated by using the upstream resource grant indication, determine that an Allocation Identifier (Allocation-ID) cached by the optical network unit successfully matches an Allocation-ID carried in the Allocation Structure message.

For specific implementation details of functions of related modules in the optical network unit 1000, refer to related descriptions of the optical network unit in the example solution in FIG. 1-E, FIG. 3-A, or FIG. 5-A. Details are not described herein again.

Figure 11:
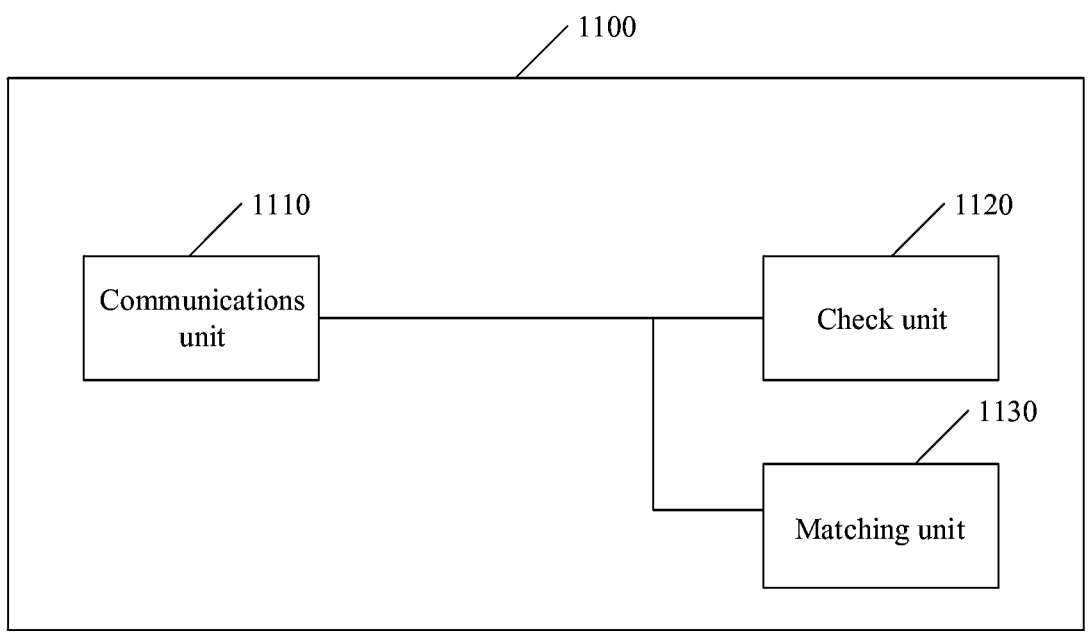
FIG. 11 is an example schematic diagram of a structure of another optical network unit according to an embodiment of this application.

Refer to FIG. 11. An embodiment of this application provides an optical network unit 1100. The optical network unit 1100 includes a communications unit 1110 and check unit 1120.

The communications unit 1110 is configured to receive a jointly checked-encoded upstream grant message, where a check field of the jointly checked-encoded upstream grant message is obtained by performing joint check encoding by using a joint check parameter and a payload field of the upstream grant message, and the joint check parameter includes a physical identity of the optical network unit.

The check unit 1120 is configured to perform integrity check on the jointly checked-encoded upstream grant message by using the joint check parameter including the physical identity of the optical network unit, and the payload field and the check field of the received jointly checked-encoded upstream grant message.

The communications unit 1110 is further configured to: when the integrity check succeeds, extract an upstream resource grant indication carried in the upstream grant message, and send an upstream optical signal on an upstream resource that is granted to the optical network unit and that is indicated by using the upstream resource grant indication.

For example, the optical network unit 1100 further includes a matching unit 1130.

When the upstream grant message is a Gate message, the matching unit 1130 is configured to: before the communications unit sends the upstream optical signal on the upstream resource that is granted to the optical network unit and that is indicated by using the upstream resource grant indication, determine that a logical link identifier (LLID) cached by the optical network unit successfully matches an LLID carried in a preamble of the Gate message.

For another example, when the upstream grant message is an Allocation Structure message, the matching unit 1130 is configured to: before the communications unit sends the upstream optical signal on the upstream resource that is granted to the optical network unit and that is indicated by using the upstream resource grant indication, determine that an Allocation Identifier (Allocation-ID) cached by the optical network unit successfully matches an Allocation-ID carried in the Allocation Structure message.

For specific implementation details of functions of related modules in the optical network unit 1100, refer to related descriptions of the optical network unit in the example solution in FIG. 2-A, FIG. 4-A, or FIG. 6-A. Details are not described herein again.

Figure 12:
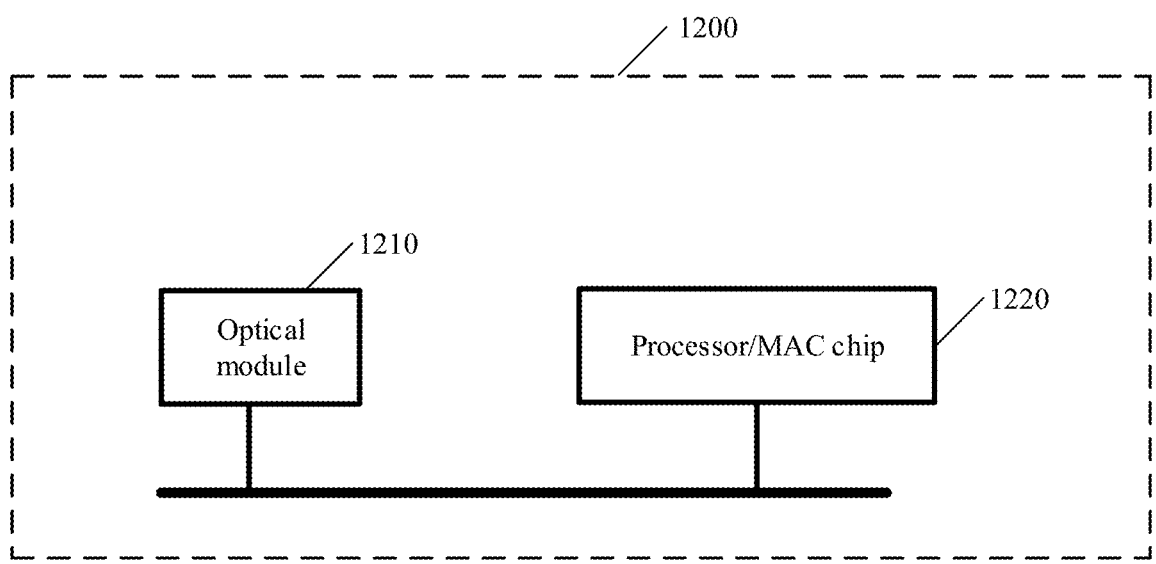
FIG. 12 is an example schematic diagram of a structure of another optical network unit according to an embodiment of this application.

Refer to FIG. 12. An embodiment of this application provides an optical network unit 1200. The optical network unit 1200 may include an optical module 1210 and a processor and/or MAC chip 1220 coupled to the optical module 1210. The processor and/or MAC chip 1220 are/is configured to perform some or all steps of any method that is performed by the optical network unit and that is provided in the embodiments of this application.

Figure 13:
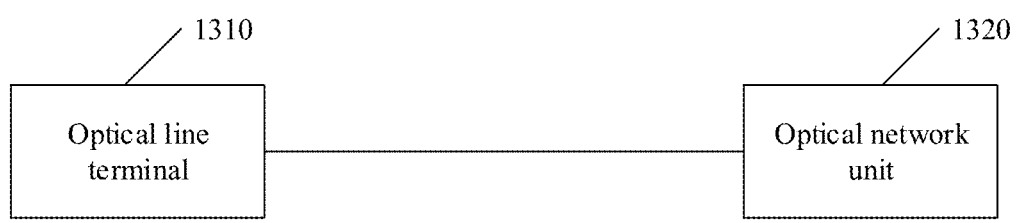
FIG. 13 is an example schematic diagram of a passive optical network according to an embodiment of this application.

Refer to FIG. 13. An embodiment of this application provides a passive optical network. The passive optical network may include an optical line terminal 1310 and an optical network unit 1320. The optical line terminal 1310 can be configured to perform some or all steps of any method that is performed by the optical line terminal and that is provided in the embodiments of this application. The optical network unit 1320 can be configured to perform some or all steps of any method that is performed by the optical network unit and that is provided in the embodiments of this application.

An embodiment of this application provides a computer-readable storage medium. The computer-readable storage medium stores a computer program. When the computer program is executed by hardware, some or all steps of any method that is performed by an optical line terminal and that is provided in the embodiments of this application can be implemented.

An embodiment of this application provides a computer-readable storage medium. The computer-readable storage medium stores a computer program. When the computer program is executed by hardware, some or all steps of any method that is performed by an optical network unit and that is provided in the embodiments of this application can be implemented.

An embodiment of this application provides a computer program product. When a computer program is executed by hardware, some or all steps of any method that is performed by an optical line terminal and that is provided in the embodiments of this application can be implemented.

An embodiment of this application provides a computer program product. When a computer program is executed by hardware, some or all steps of any method that is performed by an optical network unit and that is provided in the embodiments of this application can be implemented.

An embodiment of this application further provides a computer-readable storage medium. The computer-readable storage medium stores a computer program, and the computer program is executed by hardware (for example, a processor), to perform some or all steps of any method that is performed by any device and that is in the embodiments of this application.

An embodiment of this application further provides a computer program product including instructions. When the computer program product is run on a computer device, the computer device is enabled to perform some or all steps of any method that is performed by any device and that is in the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, descriptions of the embodiments have respective focuses. For a part that is not described in detail in an embodiment, refer to related descriptions in other embodiments.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division or may be other division during actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located at one position or may be distributed on a plurality of network units. Some or all units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. An upstream resource grant method comprising:
generating, by an optical line terminal, an upstream grant message on which transformation processing has been performed, wherein a transformation parameter used for the transformation processing comprises a physical identity of an optical network unit and wherein the transformation processing is performed on at least one of:
   at least some payload fields of the upstream grant message by using the transformation parameter,
   a check field of the upstream grant message by using the transformation parameter, or
   the check field and the at least some payload fields of the upstream grant message by using the transformation parameter; and
sending, by the optical line terminal, the upstream grant message on which the transformation processing has been performed, wherein the upstream grant message carries an upstream resource grant indication of the optical network unit, and the upstream resource grant indication indicates an upstream resource granted to the optical network unit.

2. The method according to claim 1, wherein the upstream grant message is an Allocation Structure message, and the at least some payload fields of the upstream grant message comprise one or more of the following fields: an Allocation ID field, a Grant Size field, or a Start Time field.

3. The method according to claim 1, wherein the upstream grant message is a Gate message, and the at least some payload fields of the upstream grant message comprise a Timestamp field.

4. The method according to claim 1, wherein the transformation processing comprises scrambling processing and/or encryption processing.

5. The method according to claim 4, wherein in response to the transformation processing being the scrambling processing, the scrambling processing comprises:
performing bitwise multiplication or bitwise exclusive-OR between all to-be-scrambled fields of the upstream grant message and the physical identity of the optical network unit, to obtain a scrambling-processed upstream grant message, and
wherein a total length of all the to-be-scrambled fields of the upstream grant message is equal to a length of the physical identity of the optical network unit, or a total length of all the to-be-scrambled fields of the upstream grant message is an integer multiple of a length of the physical identity of the optical network unit; and all the to-be-scrambled fields are the at least some payload fields of the upstream grant message, or all the to-be-scrambled fields are the check field and the at least some payload fields of the upstream grant message, or all the to-be-scrambled fields are the check field of the upstream grant message.

6. The method according to claim 1, wherein the physical identity of the optical network unit comprises one or more of the following identities of the optical network unit: a device serial number, a media access control address, or a key.

7. An optical line terminal, comprising an optical module and a processor and/or media access control (MAC) chip coupled to the optical module, wherein the processor and/or MAC chip are/is configured to perform the method according to claim 1.

8. An upstream resource grant method comprising:
receiving, by an optical network unit, an upstream grant message on which transformation processing has been performed, wherein a transformation parameter used for the transformation processing comprises a physical identity of the optical network unit, wherein the transformation processing is performed on:
at least some payload fields of the upstream grant message by using the transformation parameter,
a check field of the upstream grant message by using the transformation parameter,
the check field and the at least some payload fields of the upstream grant message by using the transformation parameter;
performing, by the optical network unit by using the transformation parameter comprising the physical identity of the optical network unit, inverse transformation processing on the upstream grant message on which the transformation processing has been performed; and
in response to the inverse transformation processing being successful, extracting, by the optical network unit, an upstream resource grant indication carried in the upstream grant message on which the inverse transformation processing has been performed, and sending, by the optical network unit, an upstream optical signal on an upstream resource that is granted to the optical network unit and that is indicated by using the upstream resource grant indication.

9. The method according to claim 8, wherein
the upstream grant message is an Allocation Structure message, and the at least some payload fields of the upstream grant message comprise one or more of the following fields: an Allocation ID field, a Grant Size field, or a Start Time field.

10. The method according to claim 9, wherein
before sending, by the optical network unit, the upstream optical signal on the upstream resource that is granted to the optical network unit and that is indicated by using the upstream resource grant indication, the method further comprises: determining that an Allocation Identifier (Allocation ID) cached by the optical network unit successfully matches an Allocation ID carried in the upstream grant message on which the inverse transformation processing has been performed.

11. The method according to claim 8, wherein the upstream grant message is a Gate message, and the at least some payload fields of the upstream grant message comprise a Timestamp field.

12. The method according to claim 11, wherein
before sending, by the optical network unit, the upstream optical signal on the upstream resource that is granted to the optical network unit and that is indicated by using the upstream resource grant indication, the method further comprises: determining that a logical link identifier (LLID) cached by the optical network unit successfully matches an LLID carried in a preamble of the upstream grant message.

13. The method according to claim 8, wherein the inverse transformation processing comprises descrambling processing and/or decryption processing.

14. The method according to claim 13, wherein in response to the inverse transformation processing being the descrambling processing, the descrambling processing comprises:
performing bitwise multiplication or bitwise exclusive-OR between the physical identity of the optical network unit and all to-be-descrambled fields of the upstream grant message on which the transformation processing has been performed, to obtain a descrambling-processed upstream grant message, and
wherein a total length of all to-be-scrambled fields of the upstream grant message on which the transformation processing has been performed is equal to a length of the physical identity of the optical network unit, or a total length of all to-be-scrambled fields of the upstream grant message on which the transformation processing has been performed is an integer multiple of a length of the physical identity of the optical network unit; and all the to-be-descrambled fields are the at least some payload fields of the upstream grant message, or all the to-be-descrambled fields are the check field and the at least some payload fields of the upstream grant message, or all the to-be-descrambled fields are the check field of the upstream grant message.

15. The method according to claim 8, wherein the physical identity of the optical network unit comprises one or more of the following identities of the optical network unit: a device serial number, a media access control address, or a key.

16. An optical network unit, comprising an optical module and a processor and/or media access control (MAC) chip coupled to the optical module, wherein the processor and/or MAC chip are/is configured to perform the method according to claim 8.

17. An upstream resource grant method comprising:
generating, by an optical line terminal, a jointly checked-encoded upstream grant message, wherein a check field of the jointly checked-encoded upstream grant message is obtained by performing joint check encoding by using a joint check parameter and a payload field of the upstream grant message, and the joint check parameter comprises a physical identity of an optical network unit; and sending, by the optical line terminal, the jointly checked-encoded upstream grant message, wherein the jointly checked-encoded upstream grant message carries an upstream resource grant indication of the optical network unit, and the upstream resource grant indication indicates an upstream resource granted to the optical network unit.

18. An optical line terminal, comprising an optical module and a processor and/or media access control (MAC) chip coupled to the optical module, wherein the processor and/or MAC chip are/is configured to perform the method according to claim 6.

19. An upstream resource grant method comprising:

receiving, by an optical network unit, a jointly checked-encoded upstream grant message, wherein a check field of the jointly checked-encoded upstream grant message is obtained by performing joint check encoding by using a joint check parameter and a payload field of the upstream grant message, and the joint check parameter comprises a physical identity of the optical network unit;

performing, by the optical network unit, integrity check on the jointly checked-encoded upstream grant message by using the joint check parameter comprising the physical identity of the optical network unit, and the payload field and the check field of the received jointly checked-encoded upstream grant message; and in response to the integrity check being successful, extracting, by the optical network unit, an upstream resource grant indication carried in the upstream grant message, and sending, by the optical network unit, an upstream optical signal on an upstream resource that is granted to the optical network unit and that is indicated by using the upstream resource grant indication.

20. An optical network unit, comprising an optical module and a processor and/or media access control (MAC) chip coupled to the optical module, wherein the processor and/or MAC chip are/is configured to perform the method according to claim 19.

* * * * *

UNITED STATES PATENT AND TRADEMARK OFFICE
CERTIFICATE OF CORRECTION

| | | |
|---|---|---|
| PATENT NO. | : 12,149,337 B2 | Page 1 of 1 |
| APPLICATION NO. | : 17/827467 | |
| DATED | : November 19, 2024 | |
| INVENTOR(S) | : Wu et al. | |

It is certified that error appears in the above-identified patent and that said Letters Patent is hereby corrected as shown below:

On the Title Page

Page 2, Item (56) References Cited, Foreign Patent Documents, Column 2, Line 5:
"IN105592040 A" should read as -- CN105592040 A --

Signed and Sealed this
Third Day of June, 2025

Coke Morgan Stewart
*Acting Director of the United States Patent and Trademark Office*